United States Patent
Nakano et al.

(10) Patent No.: US 8,369,688 B2
(45) Date of Patent: Feb. 5, 2013

(54) INFORMATION BURYING DEVICE AND DETECTING DEVICE

(75) Inventors: Toshihisa Nakano, Osaka (JP); Shunji Harada, Osaka (JP); Masaya Yamamoto, Osaka (JP); Kaoru Murase, Nara (JP); Tomoki Ogawa, Osaka (JP); Ryoji Suzuki, Nara (JP); Hideshi Ishihara, Osaka (JP)

(73) Assignee: Panasonic Corporation, Osaka (JP)

( * ) Notice: Subject to any disclaimer, the term of this patent is extended or adjusted under 35 U.S.C. 154(b) by 765 days.

(21) Appl. No.: 12/304,877

(22) PCT Filed: Jun. 19, 2007

(86) PCT No.: PCT/JP2007/062260
§ 371 (c)(1),
(2), (4) Date: Sep. 25, 2009

(87) PCT Pub. No.: WO2007/148662
PCT Pub. Date: Dec. 27, 2007

(65) Prior Publication Data
US 2010/0034513 A1    Feb. 11, 2010

Related U.S. Application Data

(60) Provisional application No. 60/814,528, filed on Jun. 19, 2006.

(51) Int. Cl.
*H04N 9/80*    (2006.01)
(52) U.S. Cl. .................................................. 386/260
(58) Field of Classification Search ................. 380/203, 380/54; 382/100, 190, 251; 386/252, 260; 713/176, 189
See application file for complete search history.

(56) References Cited

U.S. PATENT DOCUMENTS

| | | | |
|---|---|---|---|
| 5,379,345 A * | 1/1995 | Greenberg | .................... 455/2.01 |
| 5,859,920 A | 1/1999 | Daly et al. | |
| 5,930,369 A | 7/1999 | Cox et al. | |
| 5,943,422 A | 8/1999 | Van Wie et al. | |
| 6,044,182 A | 3/2000 | Daly et al. | |
| 6,208,735 B1 | 3/2001 | Cox et al. | |
| 6,714,659 B2 * | 3/2004 | Linnartz | ........................ 382/100 |
| 7,024,018 B2 * | 4/2006 | Petrovic | ........................ 382/100 |

(Continued)

FOREIGN PATENT DOCUMENTS

| | | |
|---|---|---|
| JP | 09-191394 | 7/1997 |
| JP | 09-191395 | 7/1997 |

(Continued)

OTHER PUBLICATIONS

Supplementary European Search Report issued Aug. 28, 2009 in EP 07 76 7150.

(Continued)

*Primary Examiner* — Thai Tran
*Assistant Examiner* — Stephen Smith
(74) *Attorney, Agent, or Firm* — Wenderoth, Lind & Ponack, L.L.P.

(57) ABSTRACT

The present invention provides an information embedding apparatus that is capable of preventing playback stop of a content that has been shot without intention of misuse. The information embedding apparatus comprises: an acquisition unit operable to acquire the content that is played back along the playback time-line; a watermark generating unit operable to generate the watermarks such that values held by the watermarks vary according to a first rule, the first rule showing that the values should vary according to a sequential order on the playback time-line; and an embedding unit operable to embed two or more of the watermarks into the content while keeping the sequential order.

8 Claims, 14 Drawing Sheets

U.S. PATENT DOCUMENTS

| | | | |
|---|---|---|---|
| 7,650,646 B2 * | 1/2010 | Asano et al. | 726/32 |
| 7,961,949 B2 * | 6/2011 | Levy et al. | 382/190 |
| 2002/0110361 A1 * | 8/2002 | Moriyama | 386/94 |
| 2003/0154377 A1 * | 8/2003 | Hirai et al. | 713/176 |
| 2003/0174862 A1 * | 9/2003 | Rhoads et al. | 382/100 |
| 2004/0151313 A1 * | 8/2004 | Weirauch | 380/203 |
| 2004/0243820 A1 * | 12/2004 | Noridomi et al. | 713/194 |
| 2005/0002526 A1 | 1/2005 | Choi et al. | |
| 2005/0114909 A1 * | 5/2005 | Mercier | 725/141 |
| 2006/0062426 A1 | 3/2006 | Levy et al. | |
| 2006/0120559 A1 * | 6/2006 | Levy | 382/100 |
| 2006/0198549 A1 * | 9/2006 | Van Vugt et al. | 382/103 |
| 2006/0204032 A1 * | 9/2006 | Nakamura et al. | 382/100 |
| 2006/0239503 A1 * | 10/2006 | Petrovic et al. | 382/100 |
| 2007/0098172 A1 * | 5/2007 | Levy et al. | 380/247 |
| 2009/0031134 A1 * | 1/2009 | Levy | 713/176 |
| 2011/0010555 A1 * | 1/2011 | Moskowitz et al. | 713/176 |

FOREIGN PATENT DOCUMENTS

| | | |
|---|---|---|
| JP | 2003-259314 | 9/2003 |
| JP | 2004-310117 | 11/2004 |
| WO | 2005/057356 | 6/2005 |

OTHER PUBLICATIONS

Doctorow, Corey. "Hollywood Wants to Plug the "Analog Hole"" *Consensus at Lawyerpoint*. Electronic Frontier Foundation, May 23, 2002. Web. Jul. 24, 2009. <http://bpdg.blogs.eff.org/archives/000113.html>.

Lotspiech, Jeffrey. "The Advanced Access Content System's Use of Digital Watermarking" *International Multimedia Conference*. Proceedings of the 4th ACM International Workshop on Contents Protection and Security, Oct. 28, 2006. Web. Jul. 24, 2009. <http://portal.acm.org/ft_gateway.cfm?id=1178772&type=pdf&coll=GUIDE&CFID=46464644&CFTOKEN=33101092>.

International Search Report issued Sep. 12, 2007 in the International (PCT) Application of which the present application is the U.S. National Stage.

"Digital Watermarks Fundamentals—New Multimedia Protection Technology," published Aug. 21, 1998, pp. 38, 39, 100, 101, 132, 133, 146, and 147 (with partial English translation).

* cited by examiner

INFORMATION BURYING DEVICE AND DETECTING DEVICE

This application claims benefit to the provisional U.S. application 60/814,528, filed Jun. 19, 2006.

TECHNICAL FIELD

The present invention relates to a technique for protecting digital contents such as movies and music against unauthorized copying, and particularly relates to a technique using digital watermarks for the protection.

BACKGROUND ART

In recent years, since large-capacity recording media have become available and broadband networks have been developed, systems for distributing a digital content have been getting popular. In such a system, a digital content that is a digitized work such as a movie or music (hereafter simply referred to as "a content") is distributed in a form of a recording medium on which the content is recorded, or distributed via a broadband network. In such a system, a copyright for the content should be protected, and copying and playing back of the content should be permitted only under restrictions based on an agreement with a copyright holder. As a conventional technique for protecting a copyrighted work against unauthorized copying that is not permitted by a copyright holder, a method using digital watermarks is well known. A common system using digital watermarks includes a content provider's terminal apparatus (a digital watermark embedding apparatus) and a content user's terminal apparatus (a digital watermark detection apparatus). The provider's terminal apparatus (the digital watermark embedding apparatus) provides a mechanism for embedding copyright information or the like in the content. For example, the provider's terminal apparatus records the copyright information on a recording medium such as a disc. The user's terminal apparatus (the digital watermark detection apparatus) provides a mechanism for controlling playing back of the content based on the copyright information detected from the content recorded on the recording medium. If a content in which copyright information has been embedded is copied without authorization, this means that the copyright information is also copied. Therefore, with the mechanisms above, it becomes possible to control (e.g. to stop) playing back of a content copied without authorization, by detecting the copyright information.

The digital watermark technique is described in detail in Patent Documents 2 and 3. Also, Patent Document 1 discloses a technique for preventing unauthorized copying by embedding copy control information in a content using the digital watermark technique.

Meanwhile, digital video cameras (hereinafter referred to as "camcorders") have been getting popular as apparatuses for recording video data shot for personal purposes, for making a record of a child's growth for example. A camcorder is capable of digitally recording video data on a recording medium (e.g. an optical disc such as a DVD, a SD memory card and so on), and the user can easily play back and enjoy the video recorded on the recording medium using a playback apparatus (e.g. a DVD recorder). Also, now it is common to copy a personally recorded video to other recording media and distributing them to relevant parties.

Patent Document 1: U.S. Pat. No. 5,943,422
Patent Document 2: Japanese Laid-open Patent Application Publication No. H9-191394
Patent Document 3: Japanese Laid-open Patent Application Publication No. H9-191395

SUMMARY OF THE INVENTION

Problems to be Solved by the Invention

However, the conventional techniques face to the following problem for example.

Suppose a case of shooting a birthday party with a camcorder, while playing back a DVD of a children's favorite movie. In such a case, if copyright information as digital watermarks has been embedded in the audio part of the movie disc, the camcorder inevitably records audio information of the movie on a recording medium, in addition to images and voices of the children. If such a recording medium is played back with a playback apparatus, the recording medium will be regarded as a disc copied without authorization, and the playback will be stopped by the above-described mechanism.

In other words, the movie recorded by accident, not by intentional unauthorized act of the user, will be regarded as an unauthorized copy, and this makes it impossible to replay the video of the birthday party for personal use.

Here, although the example above describes a case of recording a birthday party for children on a recording medium with a camcorder, and playing back the video with a playback apparatus, note that the same problem might occur in various situations (a wedding, a sports meeting, etc.) in which a camcorder is used.

In view of the above-described problem, the object of the present invention is to provide a digital watermark embedding apparatus, a digital watermark detection apparatus and a watermark detection method that are capable of preventing playback stop of a content that has been shot without intention of misuse.

Means for Solving the Problem

To achieve the object above, one aspect of the present invention is an information embedding apparatus that embeds a plurality of watermarks into a content along a playback time-line of the content, the information embedding apparatus comprising: an acquisition unit operable to acquire the content that is played back along the playback time-line; a watermark generating unit operable to generate the watermarks such that values held by the watermarks vary according to a first rule, the first rule showing that the values should vary according to a sequential order on the playback time-line; and an embedding unit operable to embed two or more of the watermarks into the content while keeping the sequential order.

Advantageous Effects of the Present Invention

With the stated structure, the watermark embedding apparatus embeds two or more of the plurality of watermarks generated by the watermark generating unit into the content, along the playback time-line of the content. Accordingly, if the content that includes the two or more watermarks generated by the watermark embedding apparatus (hereinafter called "original content") has been recorded by a camcorder or the like while being played back, a play back apparatus that plays back the recorded content can sequentially check the embedded watermarks while playing back the recorded content, and judge whether the content being played back has been recorded without authorization or not by checking whether the detected two or more watermarks vary according to the first rule.

For example, if a content has been recorded with use of a camcorder or the like by intentionally and continuously shooting the original content in a theater or the like (i.e. the case of the unauthorized recording), the playback apparatus detects two or more watermarks from the unauthorized content that includes the original content, and judges that the sequentially detected watermarks vary according to the first rule. On the other hand, if a content has been recorded with use of a camcorder or the like by unintentionally and discontinuously (i.e. accidentally) shooting the original content being played back during a birthday party or the like, even if detecting two or more watermarks, the playback apparatus does not judge that the detected watermarks vary according to the first rule. This is because it is usual that shooting in a birthday party or the like is stopped or paused at least once in a few minutes (e.g. five minutes).

The embedding unit may divide the content into two or more blocks along the playback time-line such that each block has a prescribed length, and embed the two or more of the watermarks into any of the blocks that satisfy a prescribed condition, on a one-to-one basis.

With the stated structure, the information embedding apparatus embeds a watermark into each block that satisfies the prescribed condition. As a result, if a content that includes the two or more watermarks generated by the watermark embedding apparatus has been recorded by a camcorder or the like while being played back, a playback apparatus that plays back the recorded content can detect the watermark from each of the blocks, and check whether the one or more detected watermarks vary according to the first rule.

The values held by the watermarks may be counter values, the watermark generating unit may generate the counter values with use of a counter, and the embedding unit may embed the counter values.

With the stated structure, the information embedding apparatus embeds counter values as the watermarks. As a result, if a content that includes the two or more counter values generated by the watermark embedding apparatus has been recorded by a camcorder or the like while being played back, a playback apparatus that plays back the recorded content can detect the counter value from each of the blocks while playing back the recorded content, and judge whether the content has been recorded without authorization or not by checking whether the detected one or more counter values vary according to the first rule.

The content may include an audio part that contains audio data, the prescribed condition may be that a block into which the watermark is to be embedded has an enough information amount for embedding of any of the counter values, and the embedding unit may divide the audio part into the blocks, and embed the counter values into any of the blocks that satisfy the prescribed condition, on a one-to-one basis.

With the stated structure, the information embedding apparatus sequentially embeds the counter values into the audio part of the original content. As a result, if a content that includes the two or more counter values generated by the watermark embedding apparatus has been recorded by a camcorder or the like while being played back, a playback apparatus that plays back the recorded content can detect the counter value from the audio part of each of the blocks while playing back the recorded content, and judge whether the content has been recorded without authorization or not by checking whether the detected one or more counter values vary according to the first rule.

The embedding unit may cause the watermark generating unit to generate the counter values, and receive the counter values from the watermark generating unit, and when any one of the blocks does not satisfy the prescribed condition, the embedding unit may discard a corresponding one of the counter values.

Alternatively, when any one of the blocks does not satisfy the prescribed condition, the embedding unit may cause the watermark generating unit not to generate a corresponding one of the counter values With the stated structures, within the audio part of the original content, the information embedding apparatus embeds no watermark into blocks not having an enough information amount for watermark embedding.

Each of the blocks may include a prescribed number of sub-blocks, and when embedding the counter values into the blocks, the embedding unit may embed any one of the counter values into each of the sub-blocks included in a corresponding one of the blocks.

With the stated structure, the information embedding apparatus embeds a counter value into each of the sub-blocks included in the blocks. As a result, if a content that includes the two or more watermarks has been recorded by a camcorder or the like while being played back, even though a playback apparatus that plays back the recorded content can not detect or misdetect a counter value from a certain sub-block included in a certain block for some reason, the playback apparatus can detect the same counter value from any other sub-blocks included in the block. Therefore, the playback apparatus can judge whether the content being played back has been recorded without authorization or not by judging whether the detected one or more counter values vary according to the first rule.

The watermark generating unit may sequentially generate the counter values that are monotonically increasing.

With the stated structure, the information embedding apparatus generates the counter values such that the counter values monotonically increase. Accordingly, the playback apparatus that plays back the content, which has been obtained by recording with use of a camcorder or the like of the original content that includes two or more counter values, judges whether the content being played back has been recorded without authorization or not by judging whether the detected one or more counter values monotonically increase or not.

The watermark generating unit may sequentially generate, at a prescribed frequency, the counter values that are monotonically increasing or monotonically decreasing.

With the stated structure, the information embedding apparatus cyclically generates the counter values. Accordingly, the playback apparatus that plays back the content, which has been obtained by recording with use of a camcorder or the like of the original content that includes two or more counter values, judges whether the content being played back has been recorded without authorization or not by judging whether the detected one or more counter values vary cyclically or not.

Further, with the stated structure, a counter that can use a limited range of counter values (e.g. a 4-bit counter that can sequentially output 1 to 16) may be used as the watermark generating unit. This means that it is possible to structure the watermark generating unit at low cost.

The content may include a video part that contains a series of video data, and the embedding unit may divide the video part into the blocks, and for each of the blocks having an enough information amount for embedding any of the counter values, embed any of the counter values into at least one of frames that are included therein.

With the stated structure, the information embedding apparatus sequentially embeds the one or more counter values into the video part of the content. As a result, the playback apparatus that plays back the content, which has been obtained by recording with use of a camcorder or the like of the original content that includes two or more counter values, can detect the watermarks from the video part of each of the blocks while the content is being played back, and judge whether the detected one or more counter values vary according to the first rule.

The content may include one or more frames, the information embedding apparatus may further comprise a positional information generating unit operable, when the embedding unit embeds the watermarks into embedding target frames included in the frames on a one-to-one basis, to generate pieces of positional information that show embedding target positions for the target frames on a one-to-one basis and vary according to a second rule, the embedding target frames being frames into which the watermarks are to be embedded, the embedding target positions showing positions where the watermarks are to be embedded, and the second rule showing that the embedding target positions should vary according to the sequential order on the playback time-line, and the embedding unit may embed the watermarks into the embedding target frames according to the embedding target positions shown by the pieces of positional information.

With the stated structure, the information embedding apparatus embeds each of the watermarks based on a corresponding piece of the positional information. As a result, the playback apparatus that plays back the content, which has been obtained by recording with use of a camcorder or the like of the original content that includes two or more watermarks, can check both the first rule of the detected watermarks and the second rule of the embedding positions based on the detection position information while playing back the content. This increases the protection against the unauthorized recording.

The information embedding apparatus may further comprise: a strength information generating unit operable to generate pieces of strength information, the pieces of strength information showing embedding strengths of the watermarks on a one-to-one basis and varying according to a third rule, the third rule showing that the embedding strengths should vary according to the sequential order on the playback time-line, wherein the embedding unit may embed the watermarks according to the embedding strengths shown by the strength information.

With the stated structure, the information embedding apparatus embeds each of the watermarks according to a corresponding embedding strength. As a result, the playback apparatus that plays back the content, which has been obtained by recording with use of a camcorder or the like of the original content that includes two or more watermarks, can further check whether the third rule of the embedding strengths is followed. This further increases the protection against the unauthorized recording.

The information embedding apparatus may further comprise: a strength information generating unit operable to generate pieces of strength information, the pieces of strength information showing embedding strengths of the watermarks on a one-to-one basis and varying according to a second rule, the second rule showing that the embedding strengths should vary according to the sequential order on the playback time-line, wherein the embedding unit may embed the watermarks according to the embedding strengths shown by the strength information.

With the stated structure, the information embedding apparatus embeds each of the watermarks according to a corresponding embedding strength. As a result, the playback apparatus that plays back the content, which has been obtained by recording with use of a camcorder or the like of the original content that includes two or more watermarks, can check both the first rule of the detected watermarks and the second rule of the embedding strengths while playing back the content. This increases the protection against the unauthorized recording.

Another aspect of the present invention is a detection apparatus that detects unauthorized use of a first content in a second content that includes at least a portion of the first content, the first content having been generated by the information embedding apparatus of Claim 1, the detection apparatus comprising: a detection unit operable to detect from the second content one or more watermarks embedded in the first content; a first judging unit operable to judge whether values held by the detected watermarks and one or more past watermarks detected in the past follow a first rule, the first rule showing that the values should vary according to a sequential order on a playback time-line; a second judging unit operable to judge whether a first total count is not less than a first threshold when the first judging unit has judged affirmatively, the first total count being a total count of the detected watermarks and the past watermarks; and a playback control unit operable to obstruct a normal playback of the second content when the second judging unit has judged affirmatively.

With stated structure, the detection apparatus can judge whether the second content being played back has been recorded without authorization, based on the first total count as the total count of the watermarks arranged along the playback time-line according to the first rule.

For example, if the second content has been recorded with use of a camcorder or the like by intentionally and continuously shooting the first content in a theater or the like (i.e. the case of the unauthorized recording), the detection apparatus detects two or more watermarks from the unauthorized second content that includes the first content, and judges that the first total count of the watermarks that follow the first rule is not less than the first threshold. On the other hand, if the second content has been recorded with use of a camcorder or the like by unintentionally and discontinuously (i.e. accidentally) shooting the original content played back during a birthday party or the like, even if detecting two or more watermarks, the detection apparatus does not judge that the first total count of the watermarks that follow the first rule is not less than the first threshold. This is because it is usual that shooting in a birthday party or the like is stopped or paused at least once in a few minutes (e.g. five minutes). If detecting that the second content has been generated by recoding the first content without authorization, the detection apparatus performs control for obstructing normal playback of the second content to exclude the second content that has been recorded without authorization.

The detection unit may divide the second content into two or more playback blocks each having a prescribed length, and detect the watermarks from the playback blocks one by one.

With the stated structure, the detection apparatus divides the second content into playback blocks each having a prescribed length during playback of the second content, and detects a watermark from each playback block. If detecting two or more watermarks, the detection apparatus can judge whether the detected watermarks follow the first rule in the order of the detection.

The values held by the watermarks may be counter values generated by a counter, the detection unit may detect the counter values from the playback blocks, and the first judging unit may judge whether the counter values held by the detected watermarks and the past watermarks follow the first rule.

With the stated structure, the detection apparatus can detect a watermark from each playback block. If detecting two or more watermarks, the detection apparatus can judge whether the detected watermarks follow the first rule in the order of the detection.

The one or more watermarks of the first content may be embedded in an original audio part included in the first content, the original audio part containing audio data, the second content may include a playback audio part that includes at least a portion of the original audio part, and the detection unit may divide the playback audio part into the two or more playback blocks, and detect the watermarks from the playback blocks.

With the stated structure, the detection apparatus can detect, from each playback block, counter values of the audio part included in the first content, and judge whether the detected two or more counter values follow the first rule.

The second judging unit may include a comparison value storage subunit operable to store a comparison value to be compared with the counter values, a update subunit operable to update the comparison value in prescribed cycles, a matching count storage subunit operable to store a count of times that the comparison value coincides with any of the counter values, a comparison subunit operable to compare the comparison value with the counter values, and update the matching count stored in the matching count storage subunit when judging that the comparison value coincides with any of the counter values, a consecutiveness judging subunit operable to judge whether the matching count as the first total count is not less than the first threshold, and a repetition control subunit operable to cause the comparison subunit and the consecutiveness judging subunit to repeat operations thereof until the detection unit finishes detecting the watermarks or the playback control unit starts obstructing the normal playback of the second content, wherein the playback control unit may obstruct the normal playback of the second content when the consecutiveness judging subunit has judged affirmatively.

With the stated structure, the detection apparatus compares the comparison value with the counter value. If they are the same, the detection apparatus updates the matching count, and judges whether the matching count is not less than the first threshold. As a result, if judging that the matching count is not less than the first threshold, the detection apparatus can judge that the second content has been generated by recording the first content without authorization.

The comparison subunit may initialize the comparison value stored in the comparison value storage subunit and the matching count stored in the matching count storage subunit when judging that the comparison value does not coincide with any the counter values.

With the stated structure, the detection apparatus initializes the comparison value and the matching count if the detected counter value is different from the comparison value. As a result, if the second content has been recorded with use of a camcorder or the like by unintentionally and discontinuously (i.e. accidentally) shooting the first content played back during a birthday party or the like, a counter value detected at a certain time during the playback of the second content must be different from the comparison value, and the detection apparatus initializes the comparison value and the matching count accordingly. Therefore, the detection apparatus does not judge that the second content has been recorded without authorization.

The second judging unit may further include a non-matching count storage subunit operable to store a count of times that the comparison value does not coincide with any of the counter values, a non-matching count judging subunit operable to judge whether the non-matching count is greater than a prescribed threshold, and an initializing subunit operable to initialize the matching counter stored in the matching count storage subunit when the non-matching count judging subunit has judged affirmatively, wherein the comparison subunit may initialize the comparison value stored in the comparison value storage subunit when judging that the comparison value does not coincide with any of the counter values.

With the stated structure, the detection apparatus initializes the matching count when judging that the non-matching count is not less than the prescribed threshold. As a result, if the second content has been recorded with use of a camcorder or the like by discontinuously shooting the original content in a theater or the like in view of the prescribed threshold (e.g. when the position of the camera of the camcorder is moved intentionally, or when the shooting is obstructed by people passing in front of the camera) (i.e. the case of the unauthorized recording), the matching count stored in the matching count storage subunit will not be initialized, and it is possible to judge that this second content has been recorded without authorization.

The second judging unit may further include an initializing subunit operable to initialize the comparison value stored in the comparison value storage subunit and the matching count stored in the matching count storage subunit when playback of the second content is stopped or paused.

With the stated structure, the detection apparatus initializes the matching count when the playback of the second content is stopped or paused. As a result, the detection apparatus can avoid that the second content that has been recorded with authorization is misjudged as a content that has been recorded without authorization.

The one or more watermarks of the first content may be embedded in an original video part included in the first content, the original video part containing video data, the second content may include a playback video part that includes at least a portion of the original video part, and the detection unit may divide the playback video part into the two or more playback blocks, and detect the watermarks from the playback blocks.

With the stated structure, the detection apparatus cab detect, from each playback block, a counter value of the original video part of the first content during the playback of the second content, and judge whether the detected two or more counter values follow the first rule.

The first content may include a plurality of original frames, the watermarks may be embedded in embedding target frames included in the original frames on a one-to-one basis, at positions that vary according to a second rule, the second rule showing that the positions where the watermarks are to be embedded should vary according to the sequential order on the playback time-line, the second content may include a plurality of playback frames, at least one of which is any of the original frames, when detecting the watermarks from detection target frames, the detection unit may further acquire detection positions that show positions of the detected watermarks, the first judging unit may further judge whether the detection positions of the detected watermarks and one or more past detection positions corresponding to the past watermarks follow the second rule, when the first judging unit has judged that the second rule is followed, the second judging unit may further judge whether a second total count is not less than a second threshold, the second total count being a total count of the detection positions of the detected watermarks and the past detection positions corresponding to the past watermarks, and the playback control unit may obstruct the normal playback of the second content only when the second judging unit has judged that the first total count is not less than the first threshold and the second total count is not less than the second threshold.

With the stated structure, the detection apparatus can check both the first rule of the watermarks and the second rule of the embedding positions based on the detection position information while playing back the content. This reinforces the judgment about whether the second content has been recorded without authorization.

The watermarks may be embedded in the embedding target frames according to strengths of the watermarks, the strengths varying according to a third rule, the third rule showing that the strengths should vary according to the sequential order on the playback time-line, when detecting the watermarks from the detection target frames, the detection unit may further acquire detection strengths that show embedding strengths of the detected watermarks, the first judging unit may further judge whether or not the detection strengths of the detected watermarks and one or more past detection strengths corresponding to the past watermarks follow the third rule, when the first judging unit has judged that the third rule is followed, the second judging unit may further judge whether a third total count is not less than a third threshold, the third total count being a total count of the detection strengths of the detected watermarks and the past detection strengths corresponding to the past watermarks, and the playback control unit may obstruct the normal playback of the second content only when the second judging unit has judged that the first total count is not less than the first threshold and the second total count is not less than the second threshold and the third total count is not less than the third threshold.

With the stated structure, the detection apparatus further checks the third rule of the strengths of the embedded watermarks during the playback of the second content. This reinforces the judgment about whether the second content has been recorded without authorization.

The watermarks may be embedded in the embedding target frames according to strengths of the watermarks, the strengths varying according to a second rule, the second rule showing that the strengths should vary according to the sequential order on the playback time-line, when detecting the watermarks from the detection target frames, the detection unit may further acquire detection strengths that show embedding strengths of the detected watermarks, the first judging unit may further judge whether or not the detection strengths of the detected watermarks and one or more past detection strengths corresponding to the past watermarks follow the second rule, when the first judging unit has judged that the second rule is followed, the second judging unit may further judge whether a second total count is not less than a second threshold, the second total count being a total count of the detection strengths of the detected watermarks and the past detection strengths corresponding to the past watermarks, and the playback control unit may obstruct the normal playback of the second content only when the second judging unit has judged that the first total count is not less than the first threshold and the second total count is not less than the second threshold.

With the stated structure, the detection apparatus checks both the first rule of the watermarks and the second rule of the embedding strengths during the playback of the second content. This reinforces the judgment about whether the second content has been recorded without authorization.

Figure 1:
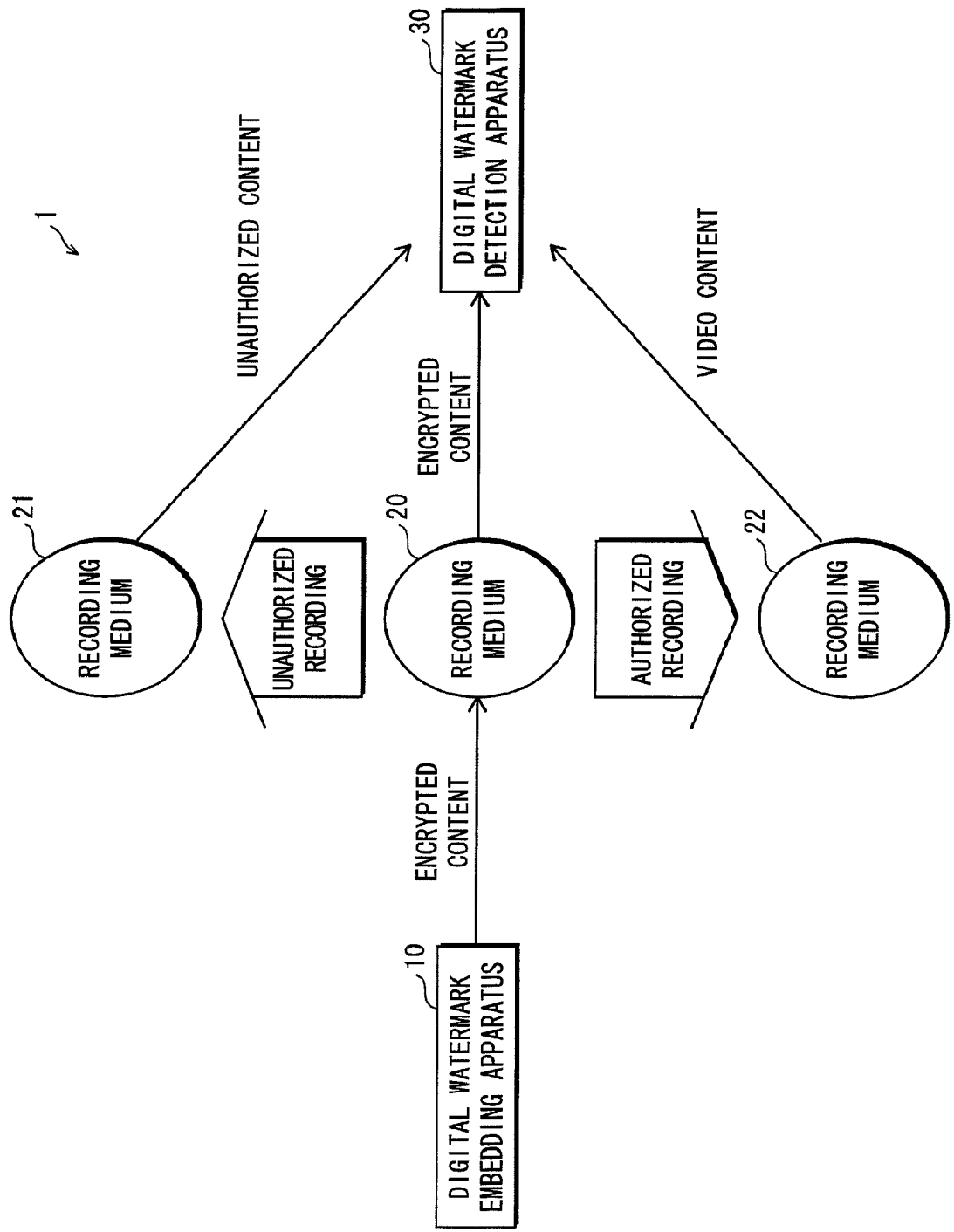
FIG. 1 shows an overall structure of a digital watermark embedding/detection system 1.

EXPLANATIONS OF REFERENCE NUMERALS 1 digital watermark embedding/detection system
10 digital watermark embedding apparatus
20, 21, 22 recording media
30 digital watermark detection apparatus
101 content storage unit
102 embedding information generating unit
103 digital watermark embedding unit
104 content encryption unit
105 content key storage unit
106 device key storage unit
107 content key encryption unit
108 output unit
109 decode unit
110 encode unit
201 encrypted content storage area
202 encrypted content key storage area
301 input unit
302 device key storage unit
303 content key decryption unit
304 content decryption unit
305 digital watermark detection unit
306 judging unit
307 control unit
308 output unit
309 identifying unit 310 decode unit
351 comparison value storage unit
352 comparison unit
353 update unit
354 comparison result processing unit
355 judgment result output unit
356 receiving unit
357 comparison result storage unit

DETAILED DESCRIPTION OF THE INVENTION

The following explains embodiments of the present invention, with reference to the drawings.

1. The First Embodiment

The following explains a digital watermark embedding/detection system 1 as the first embodiment pertaining to the present invention.

1.1 Structure of Digital Watermark Embedding/Detection System 1

The digital watermark embedding/detection system 1 includes a digital watermark embedding apparatus 10, a recording medium 20, and a digital watermark detection unit 30, which are illustrated in FIG. 1.

The digital watermark embedding apparatus 10 embeds a watermark as a digital watermark into a target content, and encrypts the content into which the watermark has been embedded. The digital watermark embedding apparatus 10 records the encrypted content onto the recording medium 20. Here, it is assumed that the content is consisted of an audio part that includes audio data and a video part that includes video data. The watermark is explained later.

The recording medium 20 stores therein an encrypted content. Here, it is assumed that the encrypted content recorded on the recording medium 20 is under copy protection, and it is impossible to copy the content to another recording medium as long as the content is in the encrypted state.

A recording medium 21 stores unauthorized video and audio data, which has been output from a monitor or the like through playback of the encrypted content stored on the recording medium 20, and recorded by a camcorder or the like without authorization. In the following explanations, the unauthorized recording by a camcorder or the like of the video and audio data output from a monitor or the like is called "unauthorized recording". The video and audio data recorded on a recording medium by unauthorized recording is called "unauthorized content". Here, note that the unauthorized content recorded on the recording medium 21 is not encrypted, because, in the unauthorized recording, the video and audio data output from the monitor or the like is directly recorded on the recording medium 21 by the camcorder or the like.

A recording medium 22 stores thereon a content including video data and audio data recorded by the camcorder, such as a recording of a birthday party, together with the video data and the audio data that has been recorded through playback of the encrypted content. In the following explanations, recording video and audio data (e.g. recording a birthday party) while playing back the encrypted content stored on the recording medium 20 is called "authorized recording". The content recorded by the authorized recording is called "video content". Assume that the video content is not encrypted.

In the following explanations, the video content and the unauthorized content are collectively called "recording content". Also, it is assumed that the encrypted content and the recording content have been compression-coded by encoding. The encoding is not described here because it is a well-known technology.

Any one of the recording medium 20, the recording medium 21 and the recording medium 22 is to be mounted on the digital watermark detection apparatus 30. The digital watermark detection apparatus 30 reads a content (the encrypted content or the recording content) from the mounted recording medium. If the read content is the encrypted content, the digital watermark detection apparatus 30 plays back the content without detecting a watermark. If the read content is the recording content, the digital watermark detection apparatus 30 detects a watermark from the read recording content, and controls playback of the recording content based on the detected watermark.

In this regard, the DES cryptosystem, the AES cryptosystem, or the like is used for encryption of the content on the recording medium 20. Since these encryption techniques are well known, their explanations are omitted here.

1.2 Structure of Digital Watermark Embedding Apparatus 10

Figure 2:
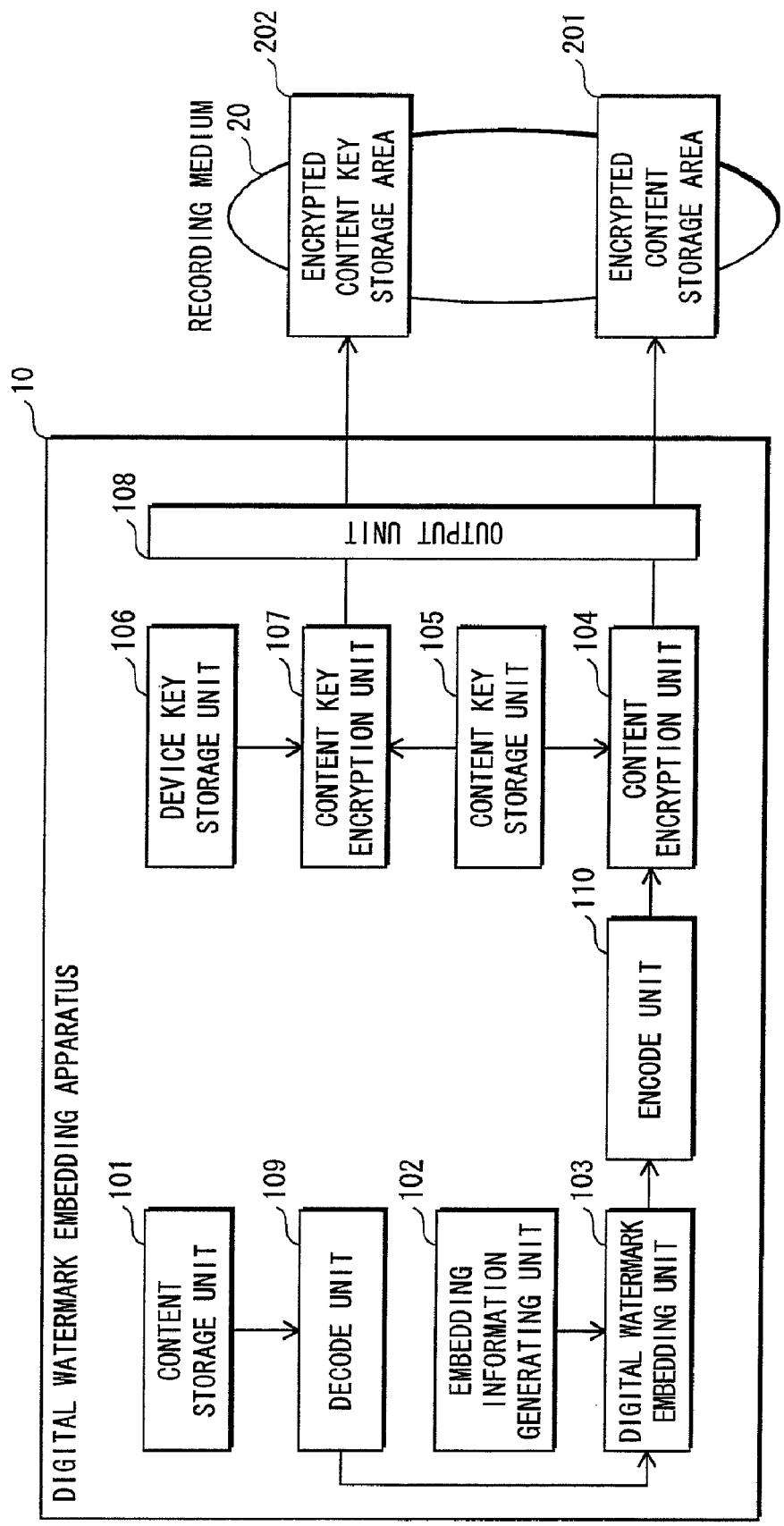
FIG. 2 is a block diagram showing the structures of a digital watermark embedding apparatus 10 and a recording medium 20.

As FIG. 2 shows, the digital watermark embedding apparatus 10 includes a content storage unit 101, an embedding information generating unit 102, a digital watermark embedding unit 103, a content encryption unit 104, a content key storage unit 105, a device key storage unit 106, a content key encryption unit 107, an output unit 108, a decode unit 109, and an encode unit 110.

The watermark embedding apparatus 10 is specifically structured from a microprocessor, a RAM, a ROM, a hard disk, and so on. The RAM, the ROM and the hard disk store a computer program. The watermark embedding apparatus 10 carries out functions as a result of the microprocessor operating in accordance with the computer program.

The following explains each of the components included in the digital watermark embedding apparatus 10.

(1) Content Storage Unit 101

The content storage unit 101 stores therein a digital content as a target of embedding of a watermark.

Here, it is assumed that the content stored in the content storage unit 101 has been compression-coded.

(2) Decode Unit 109

The decode unit 109 reads an original content from the content storage unit 101.

The decode unit 109 performs decoding and D/A conversion (digital to analog conversion) on the read content, and outputs a content consisted of analog data (hereinafter also referred to as "analog content") to the digital watermark embedding unit 103.

Note that the decoding of the compression coded content is not explained here, because it is a well-known technique.

(3) Embedding Information Generating Unit 102

The embedding information generating unit 102 receives a watermark generating instruction for generation of a watermark, from the digital watermark embedding unit 103. Upon receiving the instruction, the embedding information generating unit 102 generates a counter value as a watermark that is to be embedded into the analog content.

The embedding information generating unit 102 outputs the generated counter value to the digital watermark embedding unit 103.

Here, the initial value of the counter value is "0". The embedding information generating unit 102 adds 1 to the counter value at every reception of the watermark generating instruction from the digital watermark embedding unit 103, and updates the counter by setting the addition result as a new counter value, and outputs the addition result (i.e. the updated counter value) to the digital watermark unit 103.

(4) Digital Watermark Embedding Unit 103

The digital watermark embedding unit 103 receives the analog content from the decode unit 109, and separates the received content into an audio part and a video part.

Further, the digital watermark embedding unit 103 divides the audio part into unit blocks (hereinafter simply referred to as "blocks"), for each of which the digital watermark detection is to be performed. Here, the units of time for the digital watermark detection are 10-second intervals for example, and the digital watermark embedding unit 103 divides the audio part into blocks such that each block has a playback time length of 10 seconds.

The digital watermark embedding unit 103 embeds a watermark into each block by the following operations.

Firstly, the digital embedding unit 103 acquires the block located at the beginning of the audio part, and outputs a watermark generating instruction to the embedding information generating unit 102, and receives a counter value (i.e. a watermark) from the embedding information generating unit 102.

The digital watermark embedding unit 103 judges whether it is possible to embed the received watermark into the acquired block. In other words, the digital watermark embedding unit 103 judges whether the acquired block has an enough information amount for the embedding of the watermark. For example, the digital watermark embedding unit 103 judges whether the acquired block is consisted of only silent parts or the ratio of the silent parts included in the acquired block to the whole block is not less than a prescribed ratio (e.g. 70%), and if the digital watermark embedding unit 103 judges that the acquired block includes only silent parts or the ratio of the silent parts is not less than a prescribed ratio, the digital watermark embedding unit 103 judges that the acquired block does not have an enough information amount for embedding of the watermark. If the digital watermark embedding unit 103 judges otherwise, the digital watermark embedding unit 103 judges that the acquired block has an enough information amount for embedding of the watermark. Here, the silent parts are parts where no audio data exist. In the following explanations, a block that is consisted of only silent parts or includes a prescribed ratio (e.g. 70%) or more of silent parts is called "silent block".

If judging that it is possible to embed the watermark, the digital watermark embedding unit 103 embeds the received counter value into the acquired block. If judging that it is not possible to embed the watermark, the digital watermark embedding unit 103 discards the counter value, and cancels the embedding into the block. The embedding of the watermark is not explained here, because it is a well-known technique.

The digital watermark embedding unit 103 judges whether or not the next block exists. If the next block exists, the digital watermark embedding unit 103 acquires the next block, and performs the same operations as described above. If the next block does not exist, the digital watermark embedding unit 103 outputs an analog content, into which the watermark has been embedded, to the encode unit 110. Here, the analog content is consisted of the video part separated from the content, and the audio part that has been subject to the operations described above.

Here, as an example of watermark embedding method, the watermark is embedded as a noise into the audio data.

The technique to embed watermarks into audio data is disclosed in "*Denshi-sukashi no kiso, maruchimedia no nyu purotekuto gijyutsu* (Basic watermark technology, new protection techniques for multimedia)" (Morikita Publishing), written by Kineo MATSUI. Accordingly, the explanation of the technique is omitted here.

Specific Example

Figure 3:
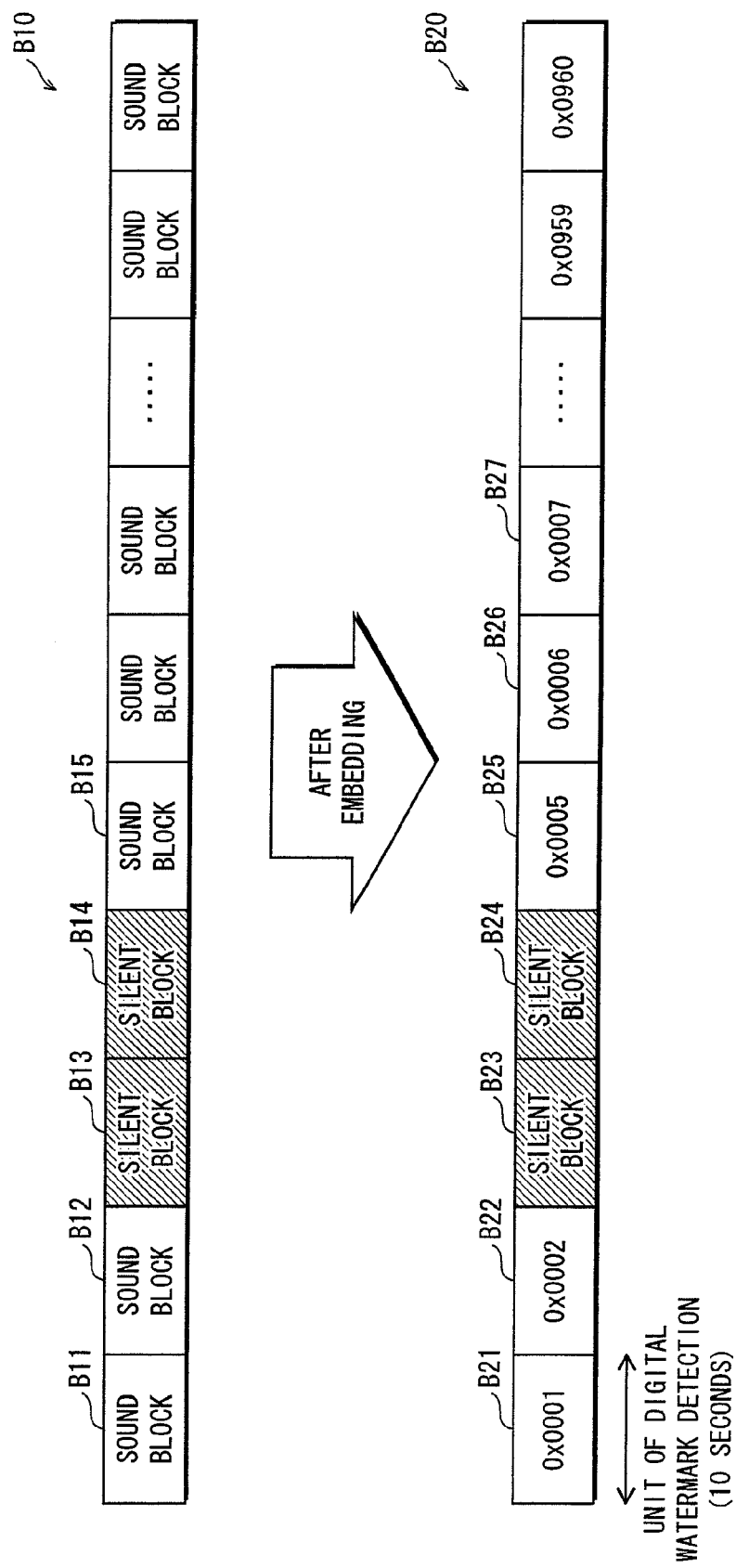
FIG. 3 shows an example of an embedding target digital content before and after embedding of a watermark.

FIG. 3 shows a specific example of an embedding target digital content before and after embedding of a watermark.

The digital watermark embedding unit 103 divides an audio part B10 into watermark embedding detection units (10-second units), namely blocks B11, B12, B13, B14, B15, and soon. In this example, the block B13 and the block B14 are silent blocks, and the other blocks B11, B12, B15 . . . are sound blocks, not silent blocks.

The embedding information generating unit 102 generates a counter value for each of the blocks one by one.

The digital watermark embedding unit 103 judges, for each of the blocks, whether it is possible to embed the counter value into it.

If judging that it is possible to embed the counter value, the digital watermark embedding unit 103 embeds, into the embedding target block, a counter value corresponding thereto.

If judging that it is not possible to embed the counter value, the digital watermark embedding unit 103 does not perform the embedding of the counter value into the embedding target block.

The digital watermark embedding unit 103 generates an audio part B20 that includes watermarks by these operations.

The audio part B20 includes blocks B23 and B24, which respectively correspond to the silent blocks B13 and B14 and include no watermark, and blocks B21, B22, B25, . . . , which respectively correspond to the non-silent blocks (the sound blocks) B11, B12, B15, . . . and respectively include counter values ("0x0001", "0x0002", "0x0005", . . . , "0x0959", "0x0960") in one-to-one correspondence.

(5) Encode Unit 110

The encode unit 110 receives from the digital watermark embedding unit 103 an analog content into which the watermarks have been embedded. Upon receiving the analog content, the encode unit 110 performs A/D conversion (analog to digital conversion) and encoding on the received content, to generate a compression-coded content (hereinafter called "after-embedding digital content").

The encode unit 110 outputs the generated content to the content encryption unit 104. The encoding of contents is not described here because it is a well-known technology.

(6) Content Key Storage Unit 105

The content key storage unit 105 stores key information (a content key) for encryption of contents.

(7) Content Encryption Unit 104

The content encryption unit 104 receives the after-embedding digital content from the encode unit 110. Upon receiving the digital content, the content key encryption unit 104 acquires the content key stored in the content key storage unit 105.

The content encryption unit 104 encrypts the received content using the acquired content key to generate an encrypted content.

The content encryption unit 104 writes the generated encrypted content into an encrypted content storage area 201 of the recording medium 20 via the output unit 108.

In this regard, the DES cryptosystem, the AES cryptosystem, or the like is used for encryption of the content on the recording medium 20. Since these encryption techniques are well known, their explanations are omitted here.

(8) Device Key Storage Unit 106

The device key storage unit 106 stores key information (a device key) for encryption the content key.

(9) Content Key Encryption Unit 107

The content key encryption unit 107 acquires the content key and the device key from the content key storage unit 105 and the device key storage unit 106 respectively.

Using the device key acquired from the device key storage unit 106, the content key encryption unit 107 encrypts the content key acquired from the content key storage unit 105 to generate an encrypted content key.

The content key encryption unit 107 writes the generated encrypted content key into a content key storage area 202 of the recording medium 20, via the output unit 108.

In this regard, the DES cryptosystem, the AES cryptosystem, or the like is used for encryption of the content on the recording medium 20. Since these encryption techniques are well known, their explanations are omitted here.

(10) Output Unit 108

The output unit 108 records the encrypted content generated by the content encryption unit 104 and the encrypted content key generated by the content key encryption unit 107 in the encrypted content storage area 201 and the encrypted content key storage area 202 of the recording medium 20.

1.3 Structure of Digital Watermark Detection Apparatus 30

Figure 4:
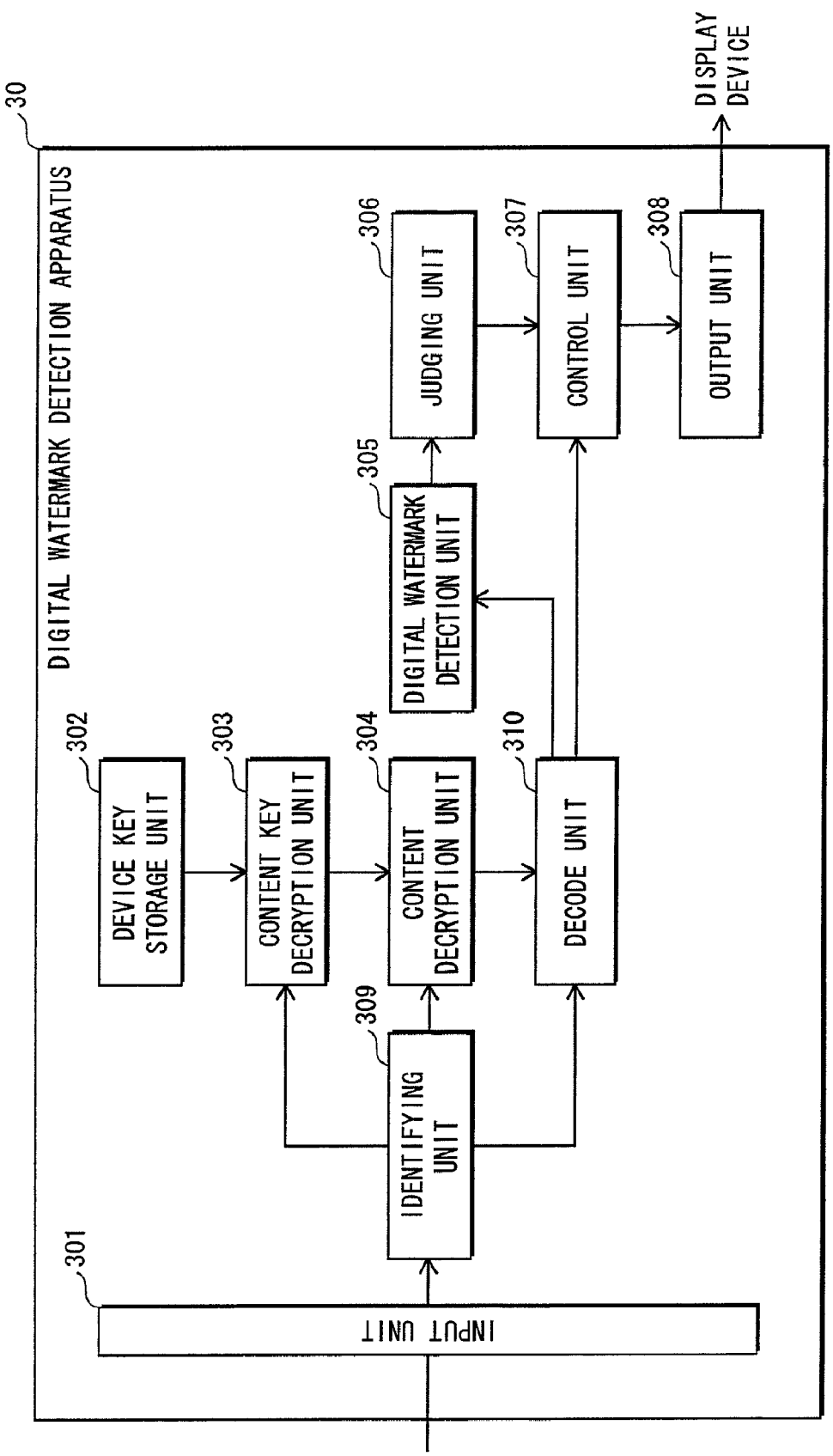
FIG. 4 is a block diagram showing the structure of a digital watermark detection apparatus 30.

As FIG. 4 shows, the digital watermark detection apparatus 30 includes an input unit 301, a device key storage unit 302, a content key decryption unit 303, a content decryption unit 304, a digital watermark detection unit 305, a judging unit 306, a control unit 307, an output unit 308, an identifying unit 309, and a decode unit 310.

The digital watermark detection apparatus 30 is specifically structured from a microprocessor, a RAM, a ROM, a hard disk, and so on. The RAM, the ROM and the hard disk store a computer program. The digital watermark detection apparatus 30 carries out functions as a result of the microprocessor operating in accordance with the computer program.

The following explains each component of the digital watermark detection apparatus 30.

(1) Identifying Unit 309

The identifying unit 309 judges whether the encrypted content is recorded on the mounted recording medium. For example, the identifying unit 309 judges whether the encrypted content key exists on the mounted recording medium.

If judging that the encrypted content is recorded (i.e. if the encrypted content key exists), the identifying unit 309 reads the encrypted content and the encrypted content key from the encrypted content storage area 201 and the encrypted content key storage area 202 respectively, via the input unit 301. The identifying unit 209 outputs the read encrypted content to the content decryption unit 304, and outputs the read encrypted content key to the content key decryption unit 303.

If judging that the encrypted content is not recorded (i.e. if the encrypted content key does not exist), the identifying unit 309 reads the recoding content (either of the unauthorized content and the video content) from the mounted recording medium via the input unit 301, and outputs the read recording content and a detection instruction for instructing detection of watermarks to the decode unit 310.

As an alternative method for the judgment mentioned above, the identifying unit 309 may judge whether the encrypted content key storage area exists on the mounted recording medium.

(2) Input Unit 301

The input unit 301 reads data from the mounted recording medium, and outputs the read data to the identifying unit 309.

(3) Device Key Storage Unit 302

The device key storage unit 302 stores therein key information (a device key) used for decrypting the encrypted content key.

(4) Content Key Decryption Unit 303

The content key decryption unit 303 receives the encrypted content key from the identifying unit 309.

The content key decryption unit 303 acquires the device key stored in the device key storage unit 302.

Using the device key, the content key decryption unit 303 decrypts the encrypted content key to generate a content key, and outputs the generated content key to the content decryption unit 304.

(5) The Content Decryption Unit 304

The content decryption unit 304 receives the encrypted content from the identifying unit 309.

Upon receiving the content key from the content key decryption unit 303, the content decryption unit 304 generates the after-embedding digital content by decrypting the encrypted content, using the received content key.

The content decryption unit 304 outputs the generated after-embedding digital content to the decode unit 310.

(6) The Decode Unit 310

Upon receiving the detection instruction and the recording content (either of the unauthorized content and the video content) from the identifying unit 309, the decode unit 310 performs the decoding and the D/A conversion on the received recording content to generate an analog content. The decode unit 310 outputs the analog content to the digital watermark detection unit 305 and the control unit 307.

Upon receiving the after-embedding digital content from the content decryption unit 304, the decode unit 310 outputs playback execution information for playback execution to the control unit 307. After that, the decode unit 310 performs the decoding and the D/A conversion on the received after-embedding digital content to generate an analog content, and outputs the generated analog content to the control unit 307.

(7) The Digital Watermark Detection Unit 305

The digital watermark detection unit 305 receives the analog content from the decode unit 310, and separates the received content into an audio part and a video part.

The digital watermark detection unit 305 further divides the audio part into blocks, for each of which the digital watermark detection is to be performed.

The digital watermark detection unit 305 performs detection of a watermark (a counter value) for each of the blocks, and outputs the detected watermarks to the judging unit 306. Note that when a block is a silent block, no watermark will be detected from it.

(8) Judging Unit 306

The judging unit 306 sequentially receives detected watermarks from the digital watermark detection unit 305.

The judging unit 306 judges whether playback of the content is permitted, based on the received one or more watermarks.

If judging that playback of the content is not permitted, the judging unit 306 outputs a playback stop information, showing that the playback is to be stopped, to the control unit 307. If judging that playback of the content is permitted, the judging unit 306 outputs a playback continue information, showing that the playback is to be continued, to the control unit 307.

The judging unit 306 is explained in detail in the section 1.4 below.

(9) Control Unit 307

The control unit 307 is equipped with a switch for connecting or disconnecting between the decode unit 310 and the output unit 308. The control unit 307 controls playback of contents, based on information output from the decode unit 310 and results of judgment by the judging unit 306.

In its initial state, the switch is connecting the decode unit 310 and the output unit 308 (Hereinafter referred to as "ON").

Upon receiving the playback execution information from the decode unit 310, the control unit 307 keeps the ON state of the switch. In this state, the control unit 307 receives the analog content from the decode unit 310, and outputs the received content to the output unit 308.

Upon receiving the result of the judgment from the judging unit 306, the control unit 307 performs the following operations, based on the received result.

If receiving the playback continue information from the judging unit 306, the control unit 307 turns on the switch so as to be in the ON state, and outputs the content to be played back to the output unit 308.

If receiving playback stop information from the judging unit 306, the control unit 307 opens the switch so as to disconnect between the decode unit 310 and the output unit 308 (this state is hereinafter referred to as "OFF"), to stop the playback of the content.

(10) Output Unit 308

The output unit 308 receives a content to be played back from the decode unit 310 via the control unit 307, and outputs the received content to a display device, such as a monitor display.

1.4 Structure of Judging Unit 306

Figure 5:
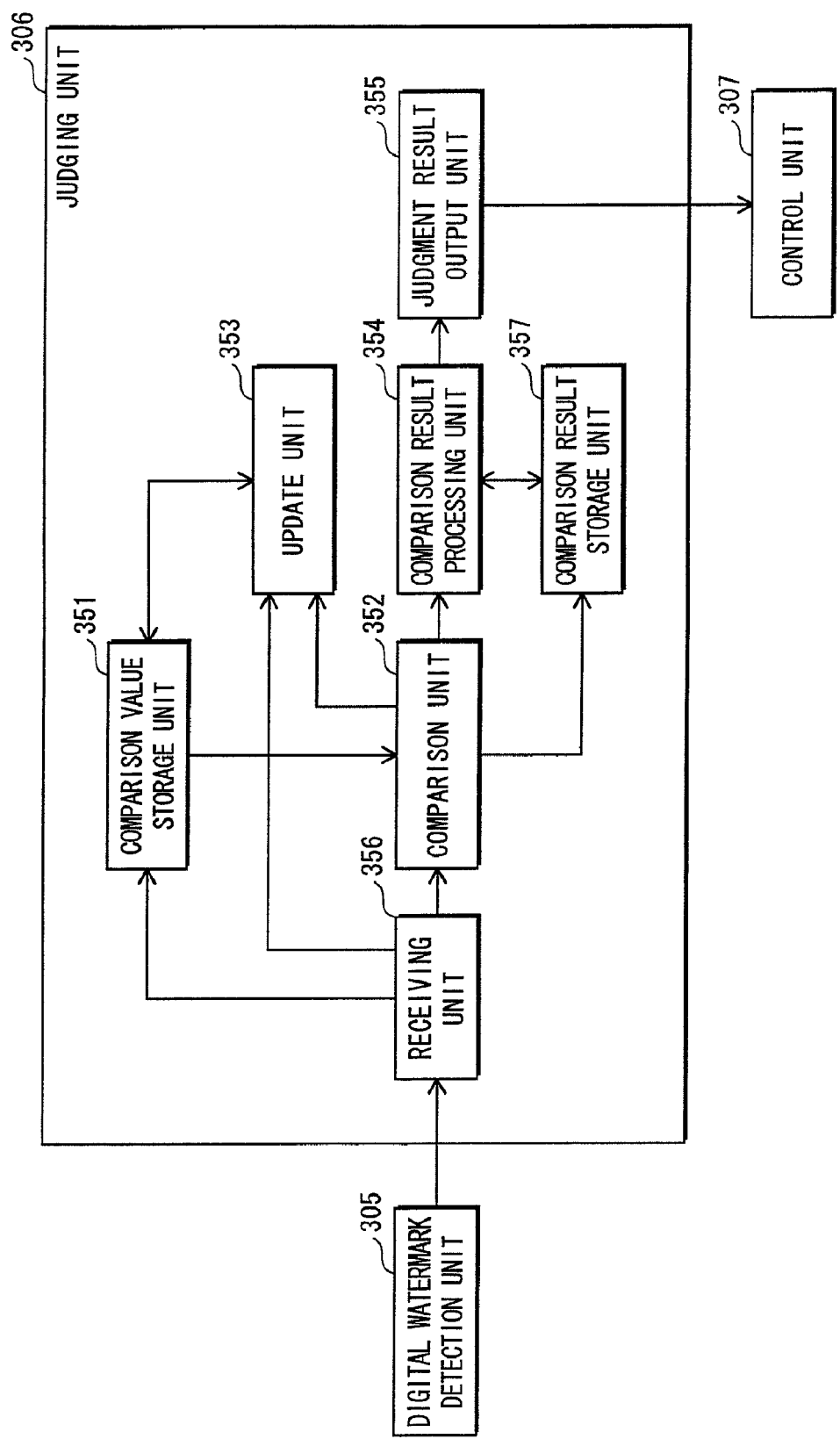
FIG. 5 is a block diagram showing the structure of a judging unit 306.

As FIG. 5 shows, the judging unit 306 includes a comparison value storage unit 351, a comparison unit 352, an update unit 353, a comparison result processing unit 354, a judgment result output unit 355, a receiving unit 356, and a comparison result storage unit 357.

(1) Comparison Value Storage Unit 351

The comparison value storage unit 351 stores therein an initial value (e.g. "0x0000") of a comparison value.

The comparison value storage unit 351 updates the comparison value to the watermark (counter value) received from the watermark detection unit 305 via the receiving unit 356.

The comparison value storage unit 351 updates the comparison value stored therein to a comparison value that has been updated at a prescribed timing by the update unit 353.

For example, in the case the content illustrated in FIG. 3 including the watermarks has been recorded by the unauthorized recording, firstly, the watermark "0x0001" in the first block is stored into the comparison value storage unit 351 as a comparison value. Next, after 10 seconds, which is a unit time length for the watermark detection, the comparison value stored in the comparison value storage unit 351 is updated from "0x0001" to "0x0002" by the update unit 353.

(2) Receiving Unit 356

The receiving unit 356 receives a watermark from the digital watermark detection unit 305.

The receiving unit 356 judges whether the value stored in the comparison value storage unit 351 is the initial value.

If judging that the value is the initial value, the receiving unit 356 outputs a start instruction for instructing start of operations to the update unit 353, and updates the value stored in the comparison value storage unit 351 to the value of the received watermark. After that, the receiving unit 356 outputs the received watermark to the comparison unit 352.

If judging that the value is not the initial value, the receiving unit 356 outputs the received watermark to the comparison unit 352.

(3) Comparison Unit 352

The comparison unit 352 receives a watermark from the digital watermark detection unit 305.

The comparison unit 352 compares a watermark received from the digital watermark detection unit 305 with the comparison value stored in the comparison value storage unit 351 to check whether they are the same.

As a result of the comparison, if they are the same, the comparison unit 352 outputs matching information, showing that they are the same, to the comparison result processing unit 354. If they are not the same, the comparison unit 352 resets the comparison value stored in the comparison value storage unit 351 (e.g. replacing the comparison value with "0x0000"), and also resets a matching count showing the number of affirmative judgments by the comparison unit 352 (e.g. replacing the matching count with "0"). Furthermore, the comparison unit 352 outputs, to the update unit 353, a stop instruction for stopping the update by the update unit 353 of the value stored in the comparison value storage unit 351.

(4) Update Unit 353

The update unit 353 updates the value stored in the comparison value storage unit 351 at prescribed timings. In the case illustrated in FIG. 3, the update unit 351 updates the value stored in the comparison value storage unit 351 every 10 seconds, because each block, into which a watermark is to be embedded, has a 10-second time length.

The update unit 353 updates the value stored in the comparison value storage unit 351 when detecting a prescribed time period elapse. In this example, the update unit 353 acquires the comparison value stored in the comparison value storage unit 351, adds 1 to the acquired comparison value, and updates the comparison value stored in the comparison value storage unit 351 to the result of the addition.

Upon receiving the stop instruction from the comparison unit 352, the update unit 353 stops operations relating to the update, i.e. stops the time measuring.

(5) Comparison Result Storage Unit 357

The comparison result storage unit 357 has an area for storing the matching count.

Note that the initial value of the matching count is "0".

(6) Comparison Result Processing Unit 354

The comparison result processing unit 354 prestores a prescribed value (e.g. 100), which is a reference value for judging whether to stop the output of the content.

Upon receiving the matching information from the comparison unit 352, the comparison result processing unit 354 updates the matching count stored in the comparison result storage unit 357 by adding 1 to the matching count.

The comparison result processing unit 354 judges whether the matching count stored in the comparison result storage unit 354 is not smaller than a prescribed value.

If judging that the matching count is not smaller than the prescribed value, the comparison result processing unit 354 generates matching count excess information, showing that the matching count is not smaller than the prescribed value, and outputs the generated matching count excess information to the judgment result output unit 355.

If judging that the matching count is smaller than the prescribed value, the comparison result processing unit 354 generates matching count non-excess information, showing that the matching count is smaller than the prescribed value, and outputs the generated matching count non-excess information to the judgment result output unit 355.

For example, in the case where the prescribed value is 100, the judgment result output unit 355 outputs the matching count excess information to the judgment result output unit 355 if receiving the matching information from the comparison unit 352 a hundred times in succession.

(7) Judgment Result Output Unit 355

Upon receiving the matching count excess information from the comparison result processing unit 354, the judgment result output unit 355 generates the playback stop information, and outputs the generated playback stop information to the control unit 307.

Upon receiving the matching count non-excess information from the comparison result processing unit 354, the judgment result output unit 355 generates the playback continue information, and outputs the generated playback continue information to the control unit 307.

1.5 Operations of Digital Watermark Embedding Apparatus 10

(1) Overall Operations

Figure 6:
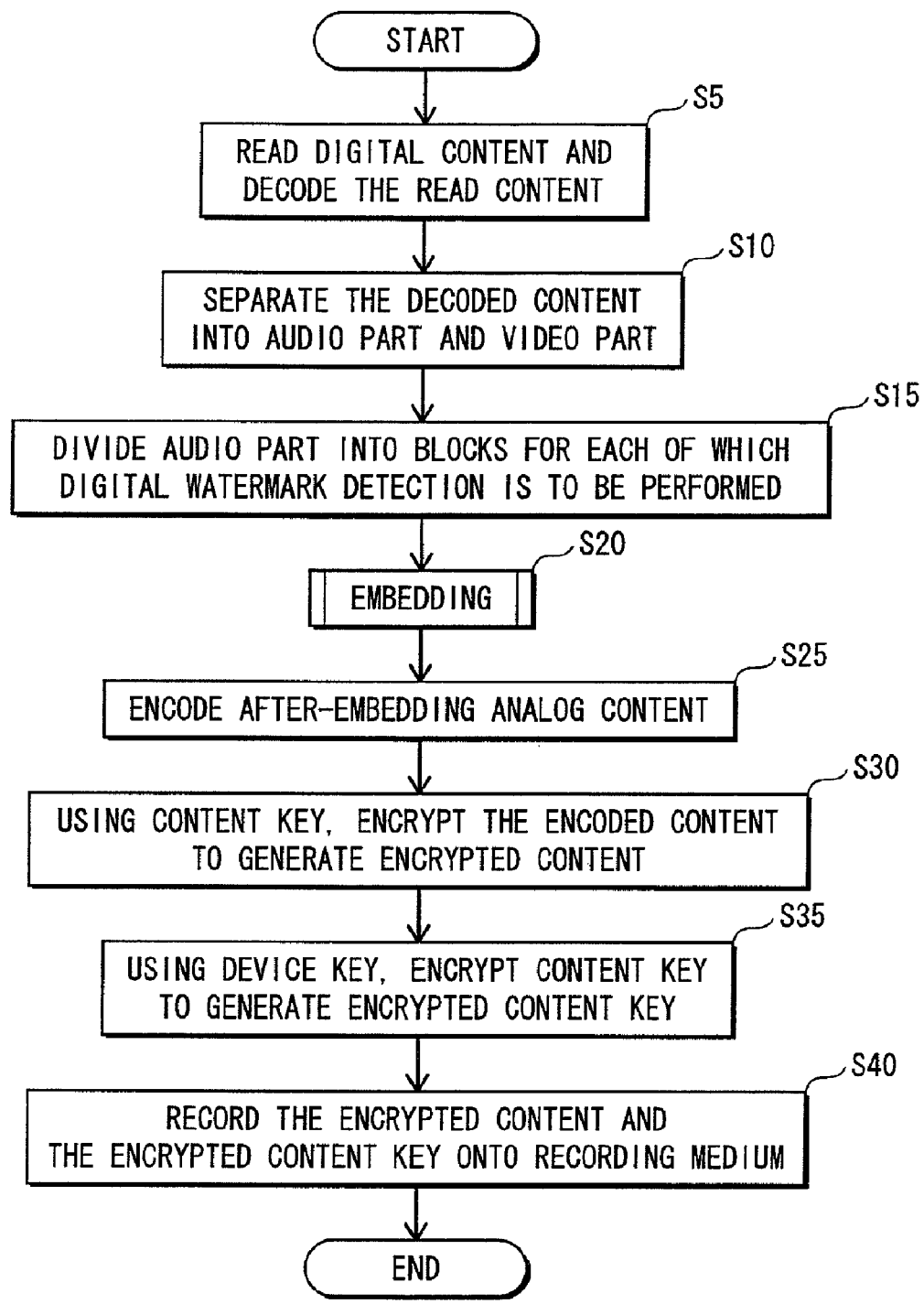
FIG. 6 is a flowchart showing operations of a digital watermark embedding apparatus 10.

The following explains overall operations of the digital watermark embedding apparatus 10, with reference to the flowchart of FIG. 6.

The decode unit 109 of the digital watermark embedding apparatus 10 reads a content from the content storage unit 101, and decodes the read content (Step S5). The digital watermark embedding unit 103 separates the content (analog content) that has been decoded and D/A-converted by the decode unit 109 into an audio part and a video part (Step S10).

The digital watermark embedding unit 103 further divides the audio part into blocks, for each of which the digital watermark detection is to be performed (Step S15).

Through the embedding operations by the embedding information generating unit 102 and the digital watermark embedding unit 103, the digital watermark embedding apparatus 10 generates an after-embedding analog content into which at least one watermark (counter value) is embedded (Step S20).

The encode unit 110 encodes the after-embedding analog content generated through the embedding operations (Step S25).

Using the content key, the content encryption unit 104 encrypts the content encoded by the encode unit 110 (i.e. after-embedding digital content) to generate an encrypted content (Step S30).

Using the device key, the content key encryption unit 107 encrypts the content key to generate an encrypted content key (Step S35).

The digital watermark embedding apparatus 10 records the generated encrypted content onto the encrypted content storage area 201 of the recording medium 20, and records the encrypted content key onto the encrypted content key storage area 202 of the recording medium 20 (Step S40).

(2) Embedding Operations

Figure 7:
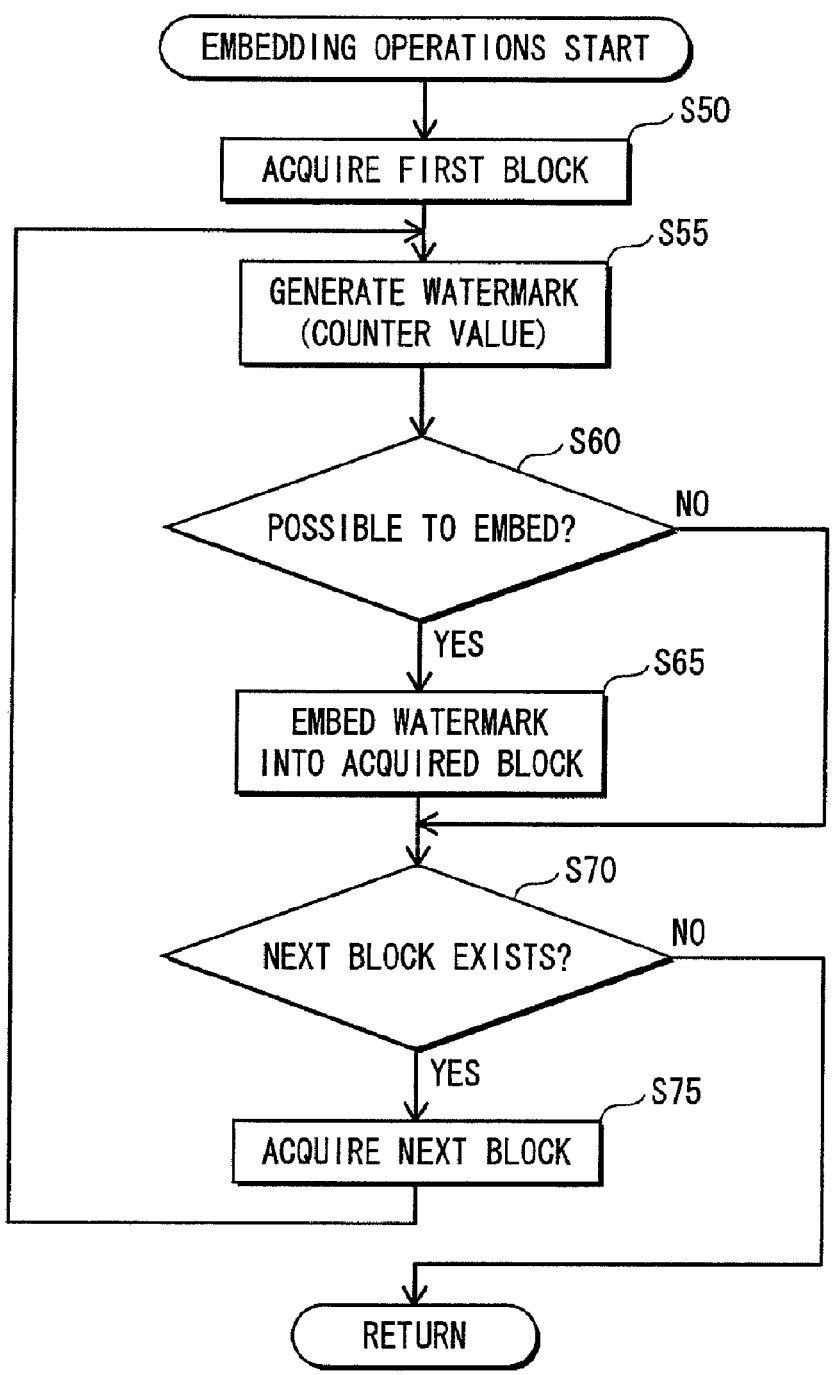
FIG. 7 is a flowchart showing operations for watermark embedding performed by the digital watermark embedding apparatus 10.

The following explains the embedding operations performed in Step S20, with reference to the flowchart of FIG. 7.

The digital watermark embedding unit 103 acquires the first block included in the audio part (Step S50).

The digital watermark embedding unit 103 outputs the watermark generating instruction to the embedding information generating unit 102. Upon receiving the watermark generating instruction from the digital watermark embedding unit 103, the embedding information generating unit 102 generates a counter value (Step S55).

The embedding information generating unit 102 outputs the generated counter value to the digital watermark embedding unit 103. The digital watermark embedding unit 103 receives the counter value from the embedding information generating unit 102. The digital watermark embedding unit 103 judges whether it is possible to embed the received watermark into the acquired block (Step S60).

If judging that it is possible to embed the watermark ("YES" in Step S60), the digital watermark embedding unit 103 embeds the received counter value into the acquired block (Step S65). The digital watermark embedding unit 103 judges whether or not the next block exists (Step S70). If judging that the next block exists ("YES" in Step S70), the digital watermark embedding unit 103 acquires the next block (Step S75), and returns to Step S55. If judging that the next block does not exist ("NO" in Step S70), the digital watermark embedding unit 103 outputs the after-embedding analog content to the encode unit 110, and finishes the embedding operations.

If judging that it is not possible to embed the watermark ("NO" in Step S60), the digital watermark embedding unit 103 performs the operations of Step S70 and later Steps.

1.6 Operations of Digital Watermark Detection Apparatus 30

Figure 8:
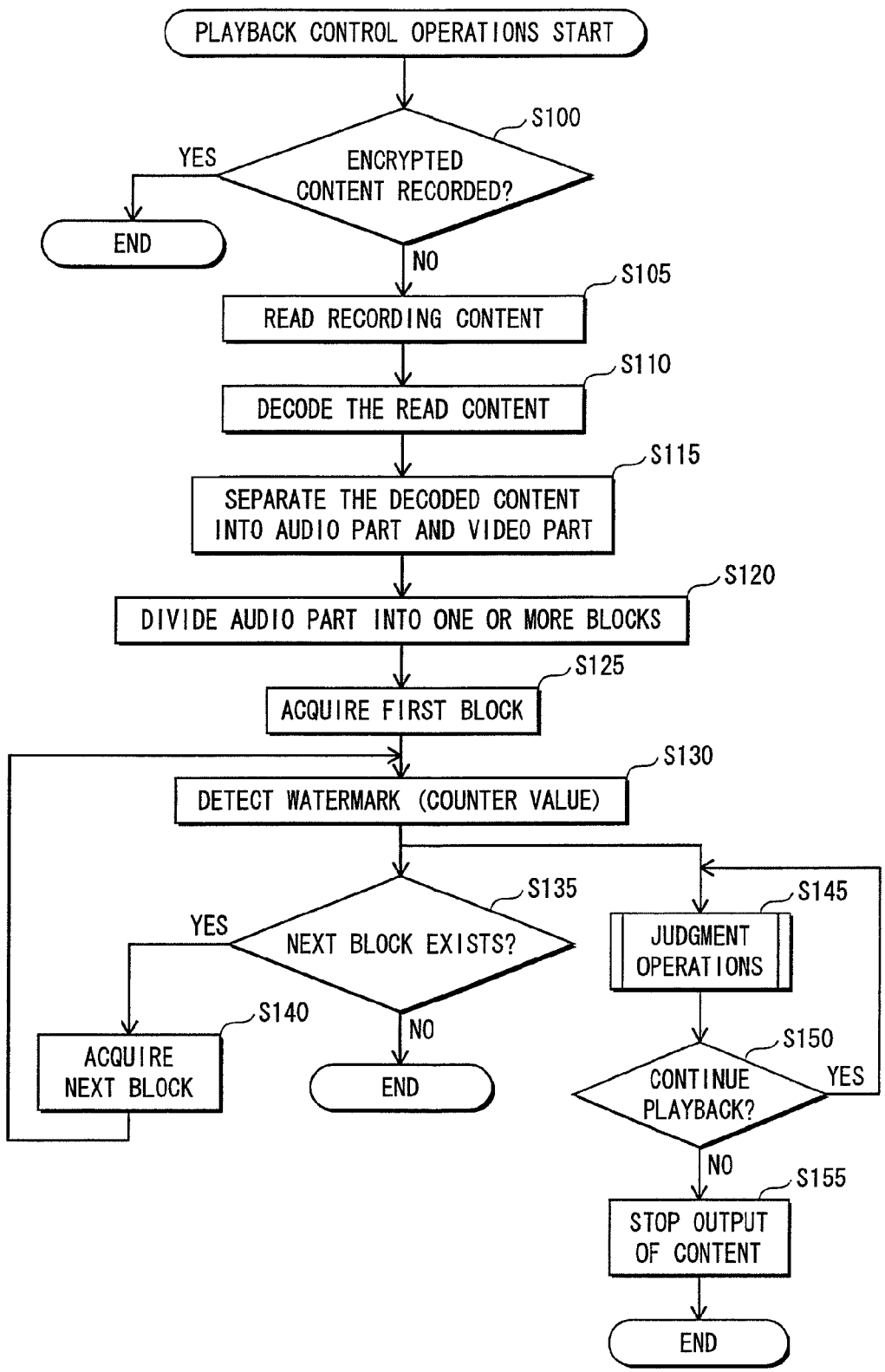
FIG. 8 is an operation for playback control performed by the digital watermark detection apparatus 30.

The following explains playback control operations by the digital watermark detection apparatus 30, with reference to the flowchart of FIG. 8. The playback control operations are performed in parallel with playback of the content recorded on the recording medium.

The identifying unit 309 judges whether the encrypted content is recorded on the mounted recording medium (Step S100).

If judging that the encrypted content is recorded ("YES" in Step S100), the digital watermark detection unit 30 finishes the playback control operations and performs normal playback operations (i.e. decrypting the encoded content and playing back the decrypted content unconditionally).

If judging that the encrypted content is not recorded ("NO" in Step S100), the identifying unit 309 reads the recoding content (either of the unauthorized content and the video content) from the mounted recording medium via the input unit 301 (Step S105). The identifying unit 309 outputs the read recording content and the detection instruction for instructing detection of watermarks to the decode unit 310.

Upon receiving the detection instruction and the recording content from the identifying unit 309, the decode unit 310 performs the decoding and the D/A conversion on the received recording content to generate an analog content (Step S110). The decode unit 310 outputs the analog content to the digital watermark detection unit 305 and the control unit 307.

The digital watermark detection unit 305 separates the received content into an audio part and a video part (Step S115).

The digital watermark detection unit 305 further divides the audio part into blocks, for each of which the digital watermark detection is to be performed (Step S120).

The digital watermark detection unit 305 acquires the first block from among the one or more split blocks (Step S125).

The digital watermark detection unit 305 detects a watermark (a counter value) from the acquired block, and outputs the detected watermark to the judging unit 306 (Step S130). Note that when a block is a silent block, no watermark will be detected from it.

The digital watermark detection unit 305 judges whether or not the next block exists (Step S135). If judging that the next block exists ("YES" in Step S135), the digital watermark detection unit 305 acquires the next block (Step S140), and returns to Step S130. If judging that the next block does not exist ("NO" in Step S135), the digital watermark detection unit 305 finishes the digital watermark detection operations.

After the execution of Step S130, the judging unit 306 performs the judgment operations (Step S145).

The control unit 307 judges whether to continue the playback based on the result of the judgment operations (Step S150). Here, the control unit 307 judges whether the information received from the judging unit 306 is the playback continue information or the playback stop information.

If determining not to continue the playback ("NO" in Step S150), i.e. if receiving the playback stop information from the judging unit 306, the control unit 307 turns off the switch, and stop the output (playback) of the content (Step S155).

If determining to continue the playback ("YES" in Step S150), i.e. if receiving the playback continue information from the judging unit 306, the control unit 307 returns to Step S145. At this moment, since the switch is in the ON state, the control unit 307 outputs the content to be played back to the output unit 308, and the output unit 308 outputs the content on the display device such as a monitor display.

1.7 Judgment Operations

Figure 9:
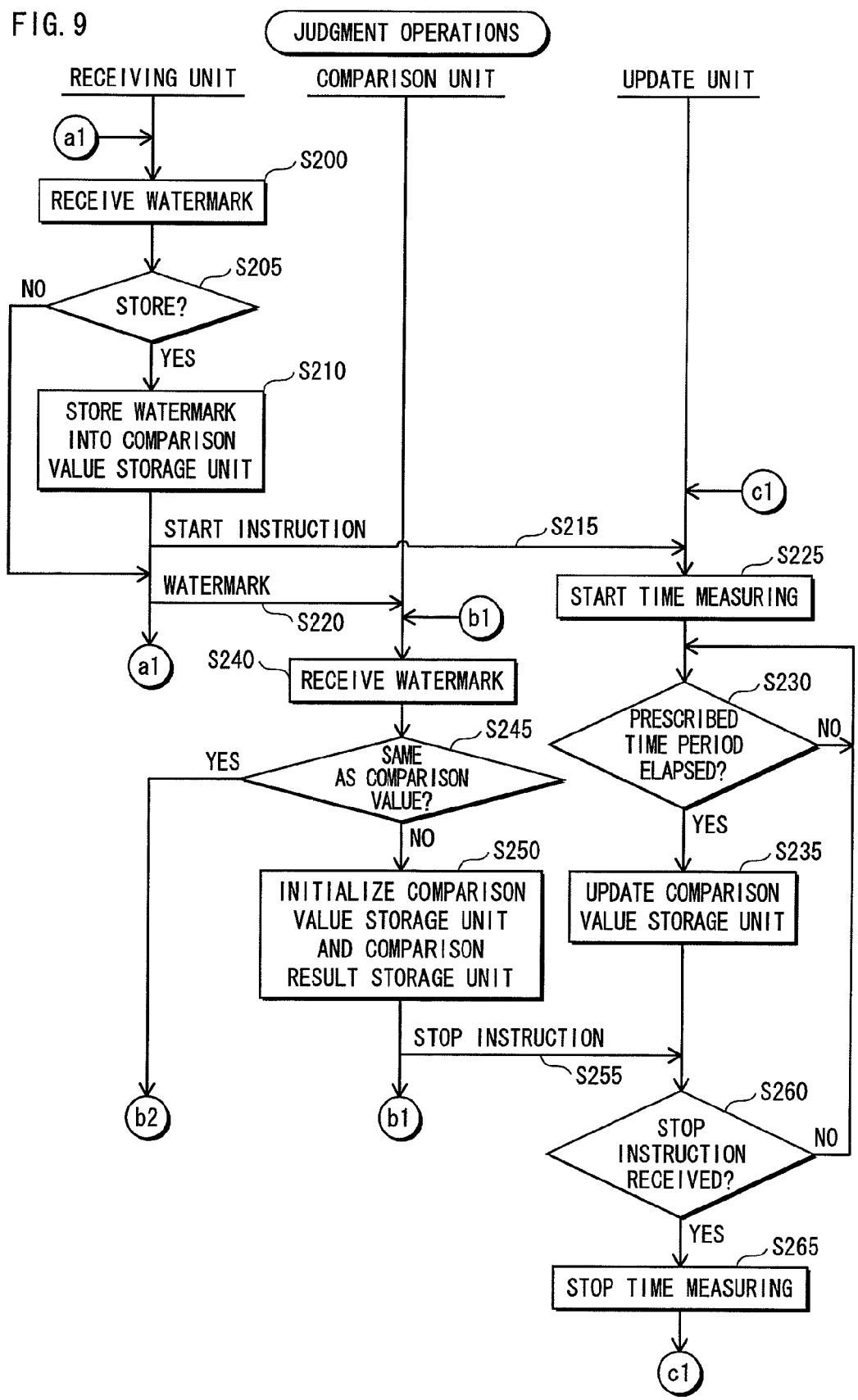
FIG. 9 is a flowchart showing operations for judgment performed by the digital watermark detection apparatus 30, followed by FIG. 10.
Figure 10:
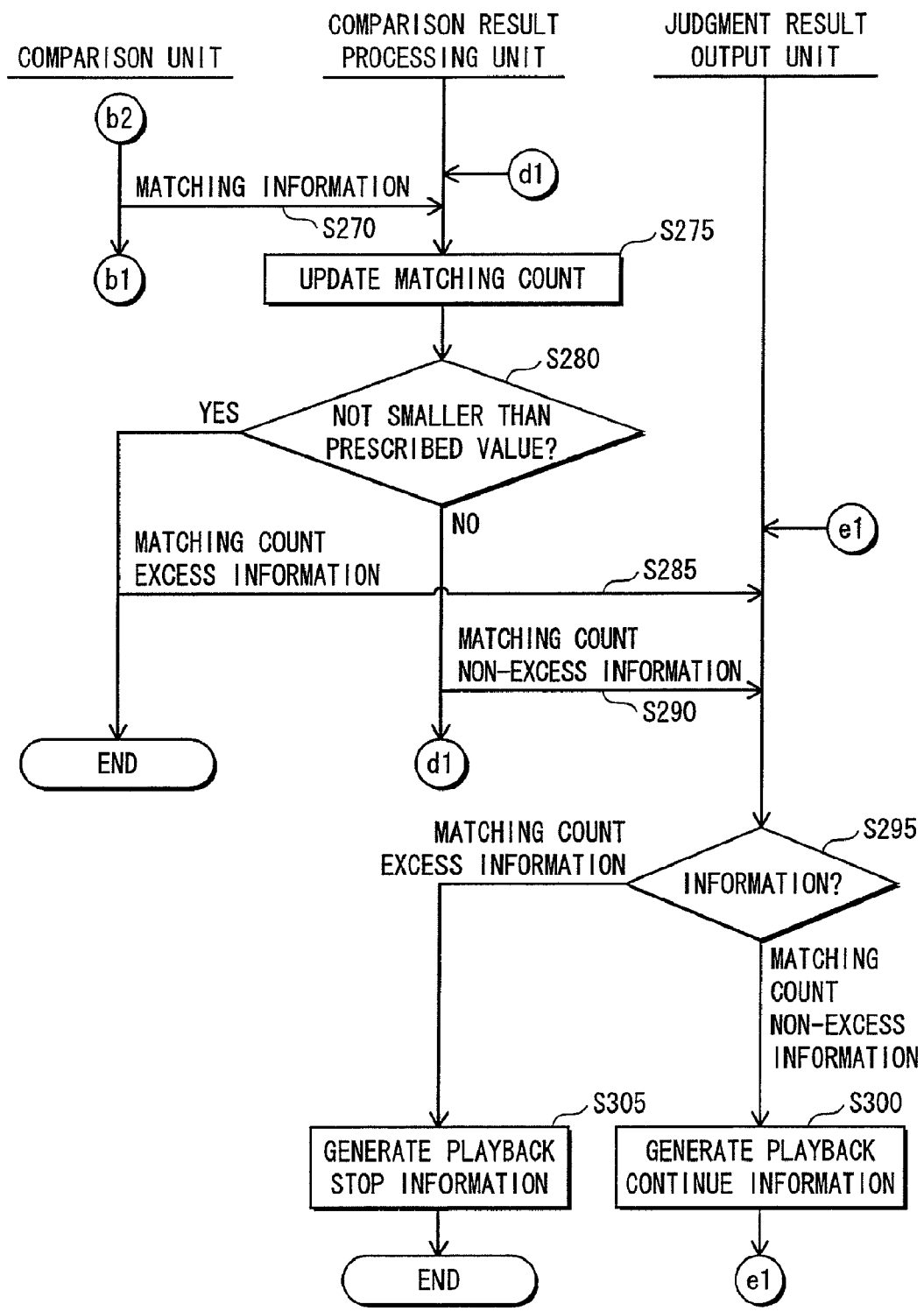
FIG. 10 is a flowchart showing operations for the judgment performed by the digital watermark detection apparatus 30, continued from FIG. 9.

The judgment operations shown in FIG. 8 is explained below with reference to the flowcharts of FIG. 9 and FIG. 10.

The receiving unit 356 receives the watermark from the digital watermark detection unit 305 (Step S200).

The receiving unit 356 judges whether to store the received watermark into the comparison value storage unit 351 (Step S205). Here, the receiving unit 356 judges whether the value stored in the comparison value storage unit 351 is the initial value or not.

If determining to store ("YES" in Step S205), i.e. if judging that the value stored in the comparison value storage unit 351 is the initial value, the receiving unit 356 stores the received watermark into the comparison value storage unit 351 (Step S210). Here, the receiving unit 356 updates the value stored in the comparison value storage unit 351 to the received watermark.

The receiving unit 356 outputs a start instruction for instructing start of operations to the update unit 353 (Step S215), and outputs the received watermark to the comparison unit 352 (Step S220).

If determining not to store ("NO" in Step S205), i.e. if judging that the value stored in the comparison value storage unit 351 is not the initial value, the receiving unit 356 performs Step S220.

Upon receiving the start instruction from the receiving unit 356, the update unit 353 starts time measuring (Step S225). The update unit 356 judges whether a prescribed time period has elapsed (Step S230). If judging that the prescribed time period has elapsed ("YES" in Step S230), the update unit 353 updates the value stored in the comparison value storage unit 351 (Step S235). If judging that the prescribed time period has not elapsed ("NO" in Step S230), the update unit 353 returns to Step S230.

Upon receiving the watermark from the digital watermark detection unit 305 (Step S240), the comparison unit 352 compares the received watermark with the comparison value stored in the comparison value storage unit 351 to check whether they are the same (Step S245).

If judging that they are not the same ("NO" in Step S245), the comparison unit 352 initializes the comparison value stored in the comparison value storage unit 351 (i.e. the comparison unit 352 changes the value to "0x0000"), and also initializes the matching count stored in the comparison result storage unit 357 (i.e. the comparison unit 352 changes the count to "0") (Step S250).

The comparison unit 352 outputs the stop instruction to the update unit 353 (Step S255).

The update unit 353 judges whether it has received the stop instruction (Step S260). If judging that the update unit 353 has received the stop instruction ("YES" in Step S260), the update unit 353 stops time measuring (Step S265), and waits for the start instruction. If judging that the update unit 353 has not received the stop instruction ("NO" in Step S260), the update unit 353 returns to Step S230.

If judging that the received watermark and the comparison value stored in the comparison value storage unit 351 are the same ("YES" in Step S245), the comparison unit 352 outputs the matching information to the comparison result processing unit 354 (Step S270).

Upon receiving the matching information from the comparison unit 352, the comparison result processing unit 354 updates the matching count stored in the comparison result storage unit 357 (Step S275). Here, the comparison result processing unit 354 updates the matching count stored in the comparison result storage unit 357 by adding 1 to the matching count.

The comparison result processing unit 354 judges whether the matching count stored in the comparison result storage unit 354 is not smaller than a prescribed value (Step S280).

If judging that the matching count is not smaller than the prescribed value ("YES" in Step S280), the comparison result processing unit 354 generates matching count excess information, showing that the matching count is not smaller than the prescribed value, and outputs the generated matching count excess information to the judgment result output unit 355 (Step S285).

If judging that the matching count is smaller than the prescribed value ("NO" in Step S280), the comparison result processing unit 354 generates matching count non-excess information, showing that the matching count is smaller than the prescribed value, and outputs the generated matching count non-excess information to the judgment result output unit 355 (Step S290).

The judgment result output unit 355 identifies the information received from the comparison result processing unit 354 (Step S295).

If judging that the received information is the matching count non-excess information (the "matching count non-excess information" of Step S295), the judgment result output unit 355 generates the playback continue information, and outputs the generated playback continue information to the control unit 307 (Step S300).

If judging that the received information is the matching count excess information (the "matching count excess information" of Step S295), the judgment result output unit 355 generates the playback stop information, and outputs the generated playback stop information to the control unit 307 (Step S305).

1.8 Modifications

The present invention is described above based on the embodiment. However, the present invention is not limited to the embodiment. The followings are possible modifications.

Figure 11:
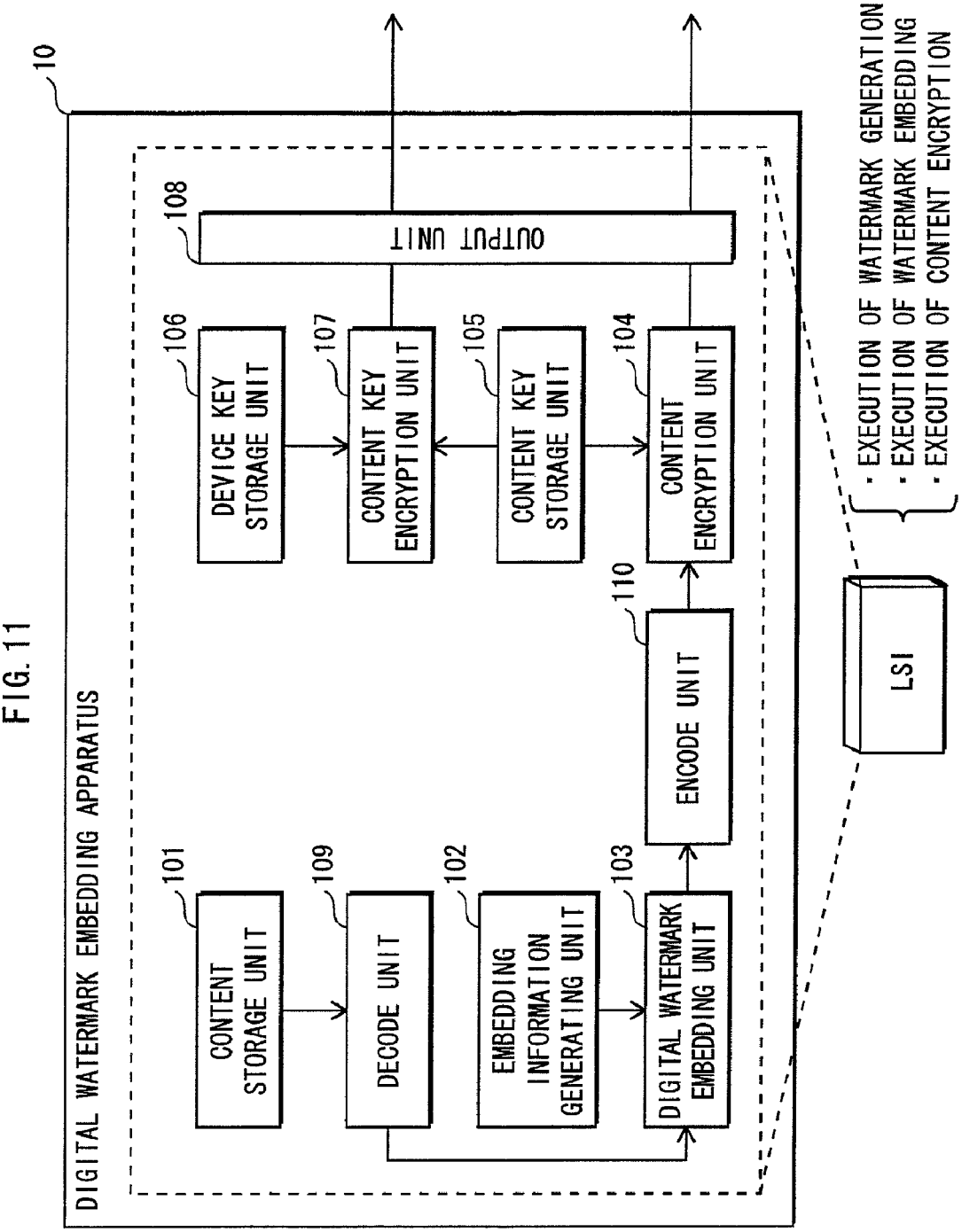
FIG. 11 shows an overall structure of an LSI that realizes a function of digital watermark embedding.

(1) In the digital watermark embedding apparatus 10 described in the embodiment above, the functional blocks of FIG. 11 surrounded by the dotted line, namely the content storage unit 101, the embedding information generating unit 102, the digital watermark embedding unit 103, the content encryption unit 104, the content key storage unit 105, the device key storage unit 106, the content key encryption unit 107, the output unit 108, and so on may be, typically, realized as an LSI (an integrated circuit). Each of the functional blocks may be individually realized as one chip. Or, they may be realized as one chip including one or all of the functional blocks.

Note that though LSI is used here, the circuit may be variously described as IC, LSI, super LSI or ultra LSI depending on the level of integration.

Note also that the technique used to make an integrated circuit does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if, due to progress in the field of semiconductor technology or the derivation of another technology, a technology to replace LSI emerges, that technology may, as a matter of course, be used to integrate the functional block. The use of biotechnology, and the like is considered to be a possibility.

Finally, each of the function blocks may be realized as software or as a combination of an LSI and software. Also, the software may be tamper-resistant.

(2) In the digital watermark detection apparatus 30 described in the embodiment above, the functional blocks, namely the input unit 301, the device key storage unit 302, the content key decryption unit 303, the content decryption unit 304, the digital watermark detection unit 305, the judging unit 306, the control unit 307, the output unit 308, and so on may be, typically, realized as an LSI (an integrated circuit). Each of the functional blocks may be individually realized as one chip. Or, they may be realized as one chip including one or all of the functional blocks.

Note that though LSI is used here, the circuit may be variously described as IC, LSI, super LSI or ultra LSI depending on the level of integration.

Note also that the technique used to make an integrated circuit does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if, due to progress in the field of semiconductor technology or the derivation of another technology, a technology to replace LSI emerges, that technology may, as a matter of course, be used to integrate the functional block. The use of biotechnology, and the like is considered to be a possibility.

Finally, each of the function blocks may be realized as software or as a combination of an LSI and software. Also, the software may be tamper-resistant.

(3) In the judging unit 306 described in the embodiment above, the functional blocks, namely the comparison value storage unit 351, the comparison unit 352, the update unit 353, the comparison result processing unit 354, the judgment result output unit 355, the receiving unit 356, and the comparison result storage unit 357, and so on may be, typically, realized as an LSI (an integrated circuit). Each of the functional blocks may be individually realized as one chip. Or, they may be realized as one chip including one or all of the functional blocks.

Note that though LSI is used here, the circuit may be variously described as IC, LSI, super LSI or ultra LSI depending on the level of integration.

Note also that the technique used to make an integrated circuit does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if, due to progress in the field of semiconductor technology or the derivation of another technology, a technology to replace LSI emerges, that technology may, as a matter of course, be used to integrate the functional block. The use of biotechnology, and the like is considered to be a possibility.

Finally, each of the function blocks may be realized as software or as a combination of an LSI and software. Also, the software may be tamper-resistant.

(4) In the embodiment above, the watermarks are embedded only in the audio part of the content. However, the present invention is not limited to this.

For example, the watermarks may be embedded only in the video part, or may be embedded in both the audio part and the video part.

In the case of embedding the watermarks in the video part, the digital watermark embedding apparatus 10 splits the video part into blocks, for each of which the digital watermark detection is to be performed, and embeds a counter value into at least one of frames included in each block.

(5) In the embodiment above, the digital watermark detection unit 30 stops the output of the content based on the result of the judgment performed by the judging unit 306. However, the present invention is not limited to this.

For example, the digital watermark detection unit 30 may stop output of only the audio part or only the video part of the content, or stop output of both the audio part and the video part.

Alternatively, instead of stopping the output of the content, the digital watermark detection unit 30 may stop playback of the content, or pause the playback of the content.

Furthermore, instead of stopping or pausing the output or the playback, the digital watermark detection unit 30 may control the output or the playback in any manner. For example, the digital watermark detection unit 30 may playback or output the audio or the video with degraded quality. Also, it is possible to lower the audio level, or mute the audio.

(6) In the embodiment above, if the watermark detected by the digital watermark detection unit 305 and the comparison value stored in the comparison value storage unit 351 are the same, the comparison unit 352 outputs the matching information to the comparison result processing unit 354. If not, the comparison unit 352 resets the comparison value stored in the comparison value storage unit 351 (i.e. changing the value to "0x0000"), and also resets the matching count stored in the comparison result storage unit 357. However, the present invention is not limited to this.

For example, a threshold value for the number of the times the comparison unit 352 judges negatively may be predetermined. If this is the case, if the watermark detected by the digital watermark detection unit 305 and the comparison value stored in the comparison value storage unit 351 are not the same, the comparison unit 352 counts the number of the times the comparison unit 352 judges negatively. When the number reaches the threshold value, the comparison unit 352 may reset the value stored in the comparison value storage unit 351 (e.g. resetting the value to "0x0000"), and also reset the matching count stored in the comparison result storage unit 357.

Further more, it is acceptable to reset the matching count stored in the comparison result storage unit 357 when the number reaches the threshold value, and reset the comparison value stored in the comparison value storage unit 351 every time the comparison result is the negative.

With the stated structure, it is possible to prevent an attack that records only part of the content discontinuously, by considering such an attack as an unauthorized copy and performing a control, such as pausing of the playback.

(7) In the embodiment above, the update unit 353 updates the value stored in the comparison value storage unit 351 at the predetermined timing to obtain the comparison value (expected value) for the watermark. However, the present invention is not limited to this.

Alternatively, the comparison value (expected value) for the watermark may be obtained based on absolute play time information, absolute address information, or the like. Here, the absolute play time information indicates how many seconds later from the playback start a certain block is to be played back if the content is played back from the beginning, and the absolute address information indicates an absolute address where a certain block is to be recorded if the content is recorded from the beginning in order of playback.

Alternatively, an identifier indicating a head of the block may be set at the head of each block. The borders of the blocks may be detected based on the identifiers, and the expected value of the watermark may be obtained based on how many blocks preceded before the block.

Also, the structures above may be combined.

(8) In the embodiment above, if the watermark detected by the digital watermark detection unit 305 and the comparison value stored in the comparison value storage unit 351 are not the same, the comparison unit 352 resets the comparison value storage unit 351 and the comparison result storage unit 357. However, the present invention is not limited to this.

For example, the comparison unit 352 may reset the comparison value storage unit 351 and the comparison result storage unit 357 at power-off. Also, the comparison unit 352 may reset the comparison value storage unit 351 and the comparison result storage unit 357 when the playback of the digital content is paused or stopped.

(9) In the embodiment above, in the case where the blocks B13 and B14 are silent blocks as FIG. 3 shows, the counter values are previously allocated to the silent blocks as well. However, the present invention is not limited to this structure.

It is not necessary to allocate counter values to the silent blocks.

Figure 12:
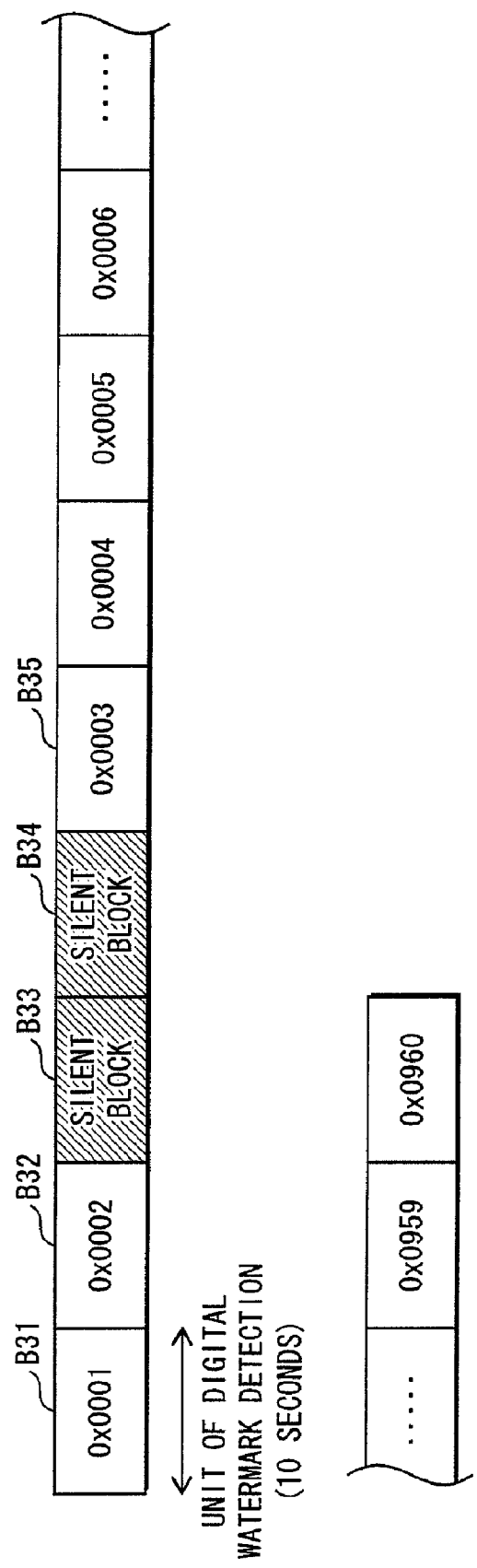
FIG. 12 shows an example data structure of an embedding target digital content after embedding of a digital watermark.

For example, as FIG. 12 shows, in the case where the blocks B33 and B34 among blocks B31, B32, B33, B34, B35 . . . that constitute the content are silent blocks, no counter value is allocated to the silent blocks B33 and B34, and counter values are sequentially allocated to the other blocks. This means that a counter value "0x0001" is embedded into the block B31, a counter value "0x0002" is embedded into the block B32, and a counter value "0x0003" (the value next to "0x0002") is embedded into the block B35.

The following explains the operations of the digital watermark detection apparatus 30 in this case.

If detecting a watermark from a block as the target of the detection, the digital watermark detection unit 305 outputs the detected watermark to the judging unit 306.

If not detecting a watermark from the block as the target of the detection, the digital watermark detection unit 305 outputs non-detection information, showing that no watermark has been detected, to the judging unit 306.

The receiving unit 356 of the judging unit 306 outputs the received non-detection information to the update unit 353.

When updating the comparison value, the update unit 353 judges whether it has received the non-detection information from the receiving unit 356. If judging that the update unit 353 has received the non-detection information, the update unit 353 cancels the updating of the comparison value. If judging not, the update unit 353 updates the comparison value.

Figure 13:
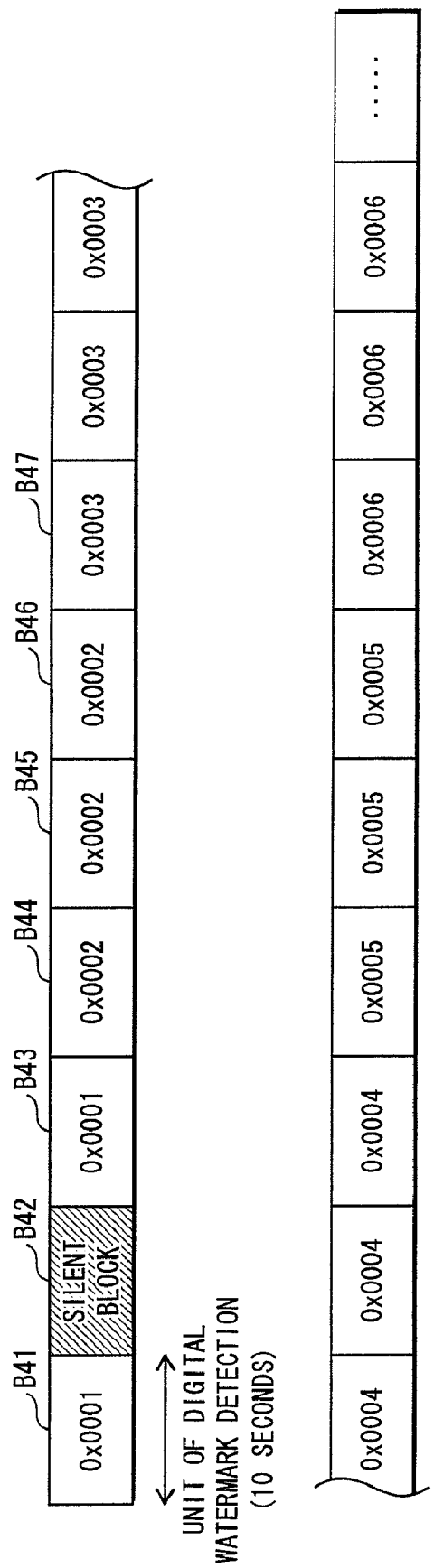
FIG. 13 shows an example data structure of an embedding target digital content after embedding of a digital watermark.

(10) In the embodiment above, as FIG. 3 shows, a counter value is sequentially allocated to each block, and counter values corresponding to blocks that are not silent blocks (sound blocks) are embedded. However, the present invention is not limited to this. For example, as FIG. 13 shows, a counter value may be embedded in each predetermined number (N) of blocks.

For example, assume that the predetermined number is 3, and blocks B41, B42, B43, B44, B45 . . . constitute the content. In this case, a counter value "0x0001" may be embedded into each of the blocks B41 to B43, and a counter value "0x0002" may be embedded into each of the blocks B44 to B46, and a counter value "0x0003" may be embedded into each of the next three blocks. If this is the case, it is acceptable not to embed the counter value into the silent blocks.

In the case of the structure above, the update unit 353 prestores therein the predetermined number N. The update unit 353 updates the comparison value when N×prescribed time has elapsed.

As a result, it is possible to embed an identical watermark into each of N sequential blocks that constitute a group, and thereby embed different watermarks into each of one or more sequential groups.

In this case, the group of the plurality of blocks (e.g. the block group that is consisted of the blocks B41, B42 and B43), into which the identical watermarks are embedded, corresponds to the block of the present invention, and each of the blocks (e.g. each of the blocks B41, B42 and B43), into which the watermark is actually embedded, corresponds to the sub block.

(11) In the embodiment above, a digital content in which a watermark is embedded is recorded on the recording medium and distributed. However, the present invention is not limited to this.

For example, such a content may be distributed via other means such as broadcasting and the Internet (e.g. an apparatus that outputs contents into which watermarks have been embedded).

(12) In the embodiment above, each of the digital watermark embedding apparatus 10 and the digital watermark detection apparatus 30 is structured as a single apparatus. However, the present invention is not limited to this.

For example, the function of the digital watermark embedding apparatus 10 and the function of the digital watermark detection apparatus 30 may be separated in a plurality of apparatuses.

(13) In the embodiment above, the counter value to be embedded as a watermark monotonically increases. However, the present invention is not limited to this.

Any values are acceptable as long as they are embedded in accordance with a certain rule. For example, a value that changes in constant cycles, such as A) 12345678123456781234678 . . . and B) 12345678765432112234567887 . . . may be used.

In the case of a sequence of numbers such as A), when a comparison value "3" is stored in the comparison value storage unit 351, for example, the update unit 353 updates the comparison value to "4".

On the contrary, in the case of a sequence of numbers such as B), it is impossible to judge whether to increase or decrease the counter value based only on the counter value in the current block. Therefore, in such a case, it is necessary for the comparison value storage unit 351 to store the counter value in the current block and the counter value in the previous block. For example, when the comparison value storage unit 351 stores a comparison value "2" (as the previous value) and a comparison value "3" (as the current value), the update unit 353 updates the comparison value to "4". Also, when the comparison value storage unit 351 stores the counter value "4" (as the previous value) and the counter value "3" (as the current value), the update unit 353 updates the comparison value to "2".

(14) In the embodiment above, the judgment result processing unit 354 outputs the playback stop information to the control unit 307 when the matching number stored in the comparison result storage unit 354 reaches a prescribed number. However, the present invention is not limited to this.

The ratio of the case where the compared values are the same may be set as the prescribed value.

The following explains the operations of the digital watermark detection apparatus 30 in this case.

As a result of the comparison, if the values are the same, the comparison unit 352 outputs the matching information to the comparison result processing unit 354, and if the values are not the same, the comparison unit 352 outputs non-matching information to the comparison result processing unit 354. Also, in the same manner as described above, if the values are not the same, the comparison unit 352 resets the comparison value stored in the comparison value storage unit 351, resets the matching count stored in the comparison result storage unit 357, and outputs the stop instruction to the update unit 353.

The comparison result processing unit 354 prestores therein a first reference value (e.g. X=100) used for calculating the matching ratio, and a second reference value (e.g. Y=0.8 (80%)) used for judging whether the playback should be continued or stopped. The comparison result processing unit 354 receives information relating to the comparison result form the comparison unit 352, and counts the number of receiving the information (reception count).

The comparison result processing unit 354 performs the above-described operations if it receives the matching information as the comparison result.

The comparison result processing unit 354 judges whether the reception count is the same as the first reference value. If judging that the reception count is the same as the first reference value, the comparison result processing unit 354 acquires the matching count (m) stored in the comparison result storage unit 357, and calculates the ratio P of the matching count to the first reference value (P=m/X).

The comparison result processing unit 354 judges whether the calculation result P is not less than the second reference value Y. If judging that the calculation result P is not less than the second reference value Y, the comparison result processing unit 354 outputs the playback stop information to the control unit 307. If judging that the calculation result P is less than the second reference value Y, the comparison result processing unit 354 outputs the playback continue information to the control unit 307.

(15) In the embodiment above, the content in which watermarks are embedded is encrypted. However, the present invention is not limited to this.

For example, it is acceptable to record or transmit a content that is not encrypted.

Also, even in the case of encrypting the content, it is not necessary to encrypt the content key using the device key and encrypt the content using the content key. For example, it is possible to add another key. Conversely, it is also possible to directly encrypt the content using the device key. Moreover, it is possible to change the value of the key based on another piece of data, and then perform the encryption.

(16) In the first embodiment above, the common key encryption method is used for the encryption and the decryption of the content and the encryption and the decryption of the content key. However, the present invention is not limited to this.

For example, the public key encryption method may be used. If this is the case, the key used for encrypting the content and the key used for decrypting the content are different. Therefore, the key to be encrypted by the content key encryption unit 107 is not the content key stored in the content key storing unit 105, but the decryption key corresponding to the content key.

(17) In the embodiment above, the digital watermark detection apparatus 30 judges whether to detect the watermark by judging whether the content recorded on the mounted recording medium has been encrypted or not. However, the present invention is not limited to this.

The digital watermark detection apparatus 30 may judge whether to detect the watermark by identifying the type of the mounted recording medium.

If this is the case, the digital watermark detection apparatus 30 judges whether the mounted recording medium is of the non-writable type (e.g. a DVD-ROM and a BD-ROM, hereinafter collectively called "ROM").

If judging that the mounted recording medium is of the ROM type, the digital watermark detection apparatus 30 does not perform the detection of the digital watermarks. If judging that the mounted recording medium is not of the ROM type (e.g. a BD-R/RE, hereinafter collectively called "R/RE"), the digital watermark detection apparatus 30 performs the detection of the digital watermarks.

Usually, a content whose copyright is protected is recorded on a recording medium that is of the ROM type and sold. On the other hand, in the case of recording, without authorization, such a content or recording a birthday party or the like, a recording medium that is of the R/RE type is used. Accordingly, with use of the above-described judgment method, it is possible to judge whether the copyright of the recorded content is protected or not.

(18) In the embodiment above, the digital watermark detection apparatus 10 embeds watermarks into the audio parts. However, the present invention is not limited to this.

The digital watermark embedding apparatus 10 may embed watermarks into the video parts such that the positions of the watermarks will be continuous.

Figure 14:
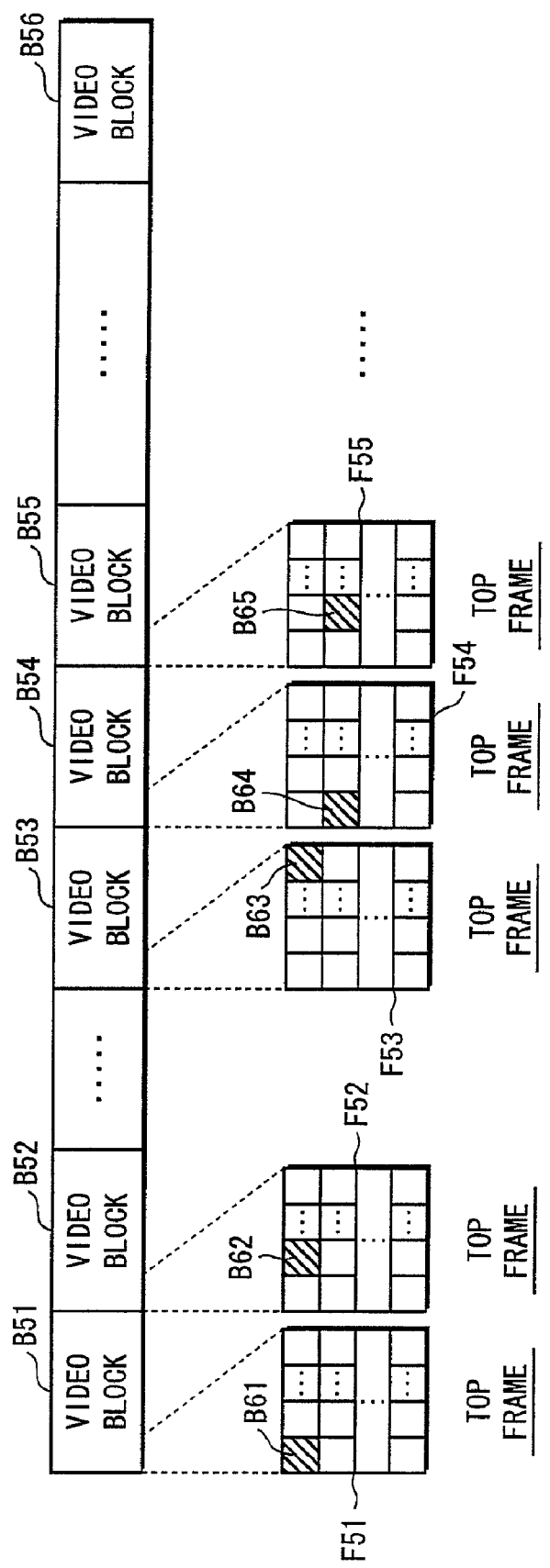
FIG. 14 shows an example case of embedding a digital watermark into a video block, based on positional information.

The following explains the above with reference to FIG. 14.

The digital watermark embedding apparatus 10 splits the video part into one or more video blocks B51, B52, ..., B53, B54, B55, ..., B56, each having a prescribed length (e.g. 10-second length). The digital watermark embedding apparatus 10 splits each of images (hereinafter called "the top frames") F51, F52, ..., F53, F54, F55, ..., F56, respectively at the beginning of the video blocks B51, B52, ..., B53, B54 B55, ..., B56 into prescribed units (e.g. macro blocks, hereinafter called "divided blocks").

The digital watermark embedding apparatus 10 embeds a watermark into each of the top frames F51, F52, ..., F53, F54, F55, ..., F56, such that the positions of the watermarks will be continuous (e.g. by changing the embedding position from left to right and top to bottom). In the same manner as in the embodiment, if the macro block as the embedding target does not have an enough information amount for the embedding of the watermark, the digital watermark embedding apparatus 10 does not embed the watermark. In the following explanations, an embedding target macro block that does not have an enough information amount for the watermark embedding is called "no-image block".

For each of the blocks resultant from the division performed in the same manner as in the embodiment above (in the order of the macro block numbers), the digital watermark detection unit 305 of the digital watermark detection apparatus 30 detects a watermark and acquires the number of the macro block into which the watermark has been embedded, and outputs the acquired macro block number to the judging unit 306. Note that no watermark will be detected if the macro block as the detection target is the no-image block.

The update unit 353 of the digital watermark detection apparatus 30 counts up the number of the macro blocks from 1 every 10 seconds, which is the unit time length of the video blocks, and updates the value stored in the comparison result storage unit 351 by using the count as the comparison value.

Upon receiving the macro block number from the digital watermark detection unit 305, the comparison unit 352 judges whether the received macro block number is the same as the comparison value stored in the comparison value storage unit 351. If judging that they are the same, the comparison unit 352 outputs the matching information to the comparison result processing unit 354. If judging not, the comparison unit 352 resets the comparison value stored in the comparison value storage unit 351 (e.g. to "0"), and also resets the matching count, which shows the number of times that it is judged that the values are the same according to the comparison result stored in the comparison result storage unit 357 (e.g. to "0"). Further, the comparison unit 352 outputs the stop instruction, which is for instructing the update unit 353 to stop updating the value stored in the comparison value storage unit 351, to the update unit 353.

Note that although each video block described above has a prescribed length (10-second length), each video block may be a frame. In other words, the watermark may be embedded into each frame.

In the description above, the embedding start position after the embedding of watermark reaches the block at the bottom right corner. In such a case, the embedding may be restarted from the top left corner, or performed in the reversed order (i.e. from the bottom right corner to the top left corner).

In the description above, the target of the watermark embedding is only the top frame included in the video block. However, the present invention is not limited to this. All the frames included in the video block may be the targets of the watermark embedding. If this is the case, if one or more frames included in the macro block have an enough information amount for the watermark embedding (such frames are hereinafter called "effective frames"), the watermark is embedded into all the effective frames.

In the description above, if the top frame of the macro block does not have an enough information amount for the watermark embedding, the watermark detection is not performed. However, the present invention is not limited to this. If it is impossible to embed the watermark into the top frame, an effective frame that has an enough information amount and included in the video block that includes the top frame may be searched for. If one or more effective frames are found, the watermark may be embedded into at least one of the effective frames.

In the description above, the macro blocks are defined as the divided blocks. However, the present invention is not limited to this. One frame may be divided into m×n pieces, and these pieces may be defined as the divided blocks. If this is the case, the divided blocks are numbered in the order from left to right and top to bottom. In other words, numbers 1 to m×n are allocated to the divide blocks respectively, in the order from left to right and top to bottom. The update unit 353 of the digital watermark detection apparatus 30 counts from 1 to m×n, and updates the value stored in the comparison value storage unit 351 using the count as the comparison value. The comparison unit 352 judges whether or not a watermark has been embedded into a block corresponding to the number that is the same as the comparison value stored in the comparison value storage unit 351. Since the subsequent operations are the same as described above, they are not explained here.

The watermarks may be the counter values as described above, or may be constant values. In the case the watermarks are the counter values, the judgment method described above, which uses the counter values, may be used in combination.

The technique to embed watermarks into image data is disclosed in "*Denshi-sukashi no kiso, maruchimedia no nyu purotekuto gijyutsu* (Basic watermark technology, new protection techniques for multimedia)" (Morikita Publishing), written by Kineo MATSUI. Accordingly, the explanation of the technique is omitted here.

(19) In the embodiment above, the digital watermark embedding apparatus 10 uses the counter values as the watermarks to retain the consecutiveness of the blocks. However, the present invention is not limited to this.

The digital watermark embedding apparatus 10 may retain the consecutiveness of the blocks according to the strengths of the watermarks.

If this is the case, the strength of each watermark can be defined with use of a level within a range from 1 to 5, for example. In this example, the level 1 shows the lowest strength. The strength increases as the level increases, and the level 5 shows the highest strength.

The digital watermark embedding apparatus 10 divides the audio part into blocks as watermark embedding detection units (10-second units), and embeds a watermark into each of the blocks such that the strengths of the watermarks cyclically vary. For example, the order of the strengths to be assigned may be 1, 2, 3, 4, 5, 1, 2 . . . , or 1, 2, 3, 4, 5, 4, 3, 2, 1, 2 . . . , or the like.

The digital watermark embedding apparatus 10 embeds a watermark into a corresponding block according to the assigned strength. Note that if the block as the target of the embedding is a silent block, the watermark embedding according to the assigned strength is not to be performed.

For each of the blocks, upon detecting a watermark in the same manner as in the embodiment above, the digital watermark detection unit 305 of the digital watermark detection apparatus 30 acquires the strength of the watermark. The digital watermark detection unit 305 outputs the acquired strength to the judging unit 306. Note that if the block as the target of the embedding is a silent block, no watermark will be detected, and accordingly no strength will be acquired.

The update unit 353 of the digital watermark detection apparatus 30 updates the comparison value every 10 seconds, which is the unit time length for the detection, in the same cyclic manner as the assignment of the strengths.

Upon receiving the strength from the digital watermark detection unit 305, the comparison unit 352 judges whether the received strength and the comparison value stored in the comparison value storage unit 351 are the same. If judging that they are the same, the comparison unit 352 outputs the matching information to the comparison result processing unit 354. If judging that they are not the same, the comparison unit 352 resets the comparison value stored in the comparison value storage unit 351 (e.g. to "0"), and also resets the matching count which shows the number of times that it is judged that the values are the same according to the comparison result stored in the comparison result storage unit 357 (e.g. to "0"). Further, the comparison unit 352 outputs the stop instruction, which is for instructing the update unit 353 to stop updating the value stored in the comparison value storage unit 351, to the update unit 353.

The watermarks to be embedded into the blocks may be the counter values as described above, or may be constant values. In the case the watermarks are the counter values, the judgment method described above, which uses the counter values, may be used in combination.

Although the digital watermark embedding apparatus 10 embeds the watermarks based on the strengths into the audio part, the present invention is not limited to this. The digital watermark embedding apparatus 10 may embed watermarks based on the strengths into the video part, or into both the audio apart and the video part.

To embed the watermarks into the pieces of audio data included in the audio part based on the strengths, the amount of the variation among the watermarks may be added to the variation of the audio data as the target of the embedding. That is, the variation of the audio data as the target of the embedding may be changed based on the strengths.

Also, to embed the watermarks into the pieces of video data included in the video part based on the strengths, the luminance level of the pixel into which the watermark is to be embedded may be changed based on the strengths.

The technique to embed watermarks into image data is disclosed in "*Denshi-sukashi no kiso, maruchimedia no nyu purotekuto gijyutsu* (Basic watermark technology, new protection techniques for multimedia)" (Morikita Publishing), written by Kineo MATSUI. Accordingly, the explanation of the technique is omitted here.

(20) In the embodiment above, the digital content as the target of the watermark embedding is consisted only of the audio part and the video part. However, the present invention is not limited to this.

The digital content as the target of the watermark embedding may be consisted only of the audio part, and may be consisted only of the video part.

(21) In the embodiment above, for the generation of the watermarks, the counter value is incremented by one every time. However, the present invention is not limited to this.

A recurrence equation may be used for the watermark generation. The recurrence equation is "$a_{n+1}=a_n+d$". In this equation, a value (watermark) used previously is used to obtain a value (watermark) that is to be used next. Here, n is an integer that is not less than 0, and $a_0$ is the initial value. In the embodiment above, d=1 and the initial value $a_0$=0.

The recurrence equation above shows an arithmetic progression. However, the present invention is not limited to this. A recurrence equation that shows a geometric progression may be used.

Also, the watermark that is to be used next may be obtained in a different way using the previous watermark. For example, the new watermark may be obtained by doubling the value of the watermark that has been used previously.

The "value (watermark) that has been used previously" includes the initial value (e.g. "0" in the embodiment).

(22) In the embodiment above, the digital watermark embedding apparatus 10 generates the watermarks using the counter. However, the present invention is not limited to this.

The digital watermark embedding apparatus 10 may pre-store a prescribed numerical sequence, and acquire the watermarks (values) to be embedded based on the order of the values included in the numerical sequence.

All the numbers included in the numerical sequence may be used, or only a sequential part of the numbers included in the sequence may be used.

Also, a character string may be used instead of the numerical sequence.

(23) Each of the above-described apparatuses is specifically a computer system structured from a microprocessor, a ROM, a RAM, a hard disk unit and the like. A computer program is stored on the RAM or the hard disk unit. Each apparatus carries out functions as a result of the microprocessor operating in accordance with the computer program. Here, a computer program is structured by combining a plurality of instruction codes for instructing a computer.

(24) A part or all of the components included in each apparatus may be realized as one system LSI (Large Scale Integration). System LSI is a super-multifunctional LSI manufactured by integrating a plurality of components on one chip. The system LSI is specifically a computer system structured from a microprocessor, a ROM, a RAM and the like, which are not illustrated. A computer program is stored on the RAM. The system LSI carries out functions as a result of the microprocessor operating in accordance with the computer program.

Each of the components included in each of the above-described apparatuses may be individually realized as one chip. Or, they may be realized as one chip including one or all of the units.

Note that though LSI is used here, the circuit may be variously described as IC, LSI, super LSI or ultra LSI depending on the level of integration. Note also that the technique used to make an integrated circuit does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if, due to progress in the field of semiconductor technology or the derivation of another technology, a technology to replace LSI emerges, that technology may, as a matter of course, be used to integrate the functional block. The use of biotechnology, and the like is considered to be a possibility.

(25) A part or all of the components included in each of the above-described apparatuses may be structured by an IC card or a single module which is attachable to the apparatus. The IC card or the module is a computer system structured from a microprocessor, a ROM, a RAM and the like. The IC card and the module may include the above-described super-multifunctional LSI. The IC card or the module carries out functions as a result of the microprocessor operating in accordance with a computer program. The IC card or the module may be tamper-resistant.

(26) The present invention may be methods shown by the above. Furthermore, the methods may be a computer program realized by a computer, and may be a digital signal of the computer program.

Furthermore, the present invention may be a computer-readable recording medium apparatus such as a flexible disk, a hard disk, a CD-ROM (compact disk-read only memory), and MO (magneto-optical), a DVD, a DVD-ROM, a DVD RAM, a BD (Blu-ray Disc) or a semiconductor memory, that stores the computer program or the digital signal. Furthermore, the present invention may be the computer program or the digital signal recorded on any of the aforementioned recording medium apparatuses.

Furthermore, the present invention may be the computer program or the digital signal transmitted on an electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium apparatus, or by transferring the program or the digital signal via a network or the like, the program or the digital signal may be executed by another independent computer system.

(27) The present invention may be any combination of the above-described embodiment and modifications.

1.9 Summary (1) One aspect of the present invention is a digital watermark embedding apparatus that embeds digital watermarks in a digital content, the digital watermark embedding apparatus comprising: a watermark generating unit operable to generate a series of digital watermarks that are different for every first unit length; and a watermark embedding unit operable to embed the digital watermarks in the digital content.

With the stated structure, the series of watermarks that are different for every first unit length is embedded in the digital content. Therefore, if the digital content is copied, it is possible to judge whether the copy is unauthorized based on whether the series of watermarks that are different for every first unit length is detected from the copy. The reason is the following. For example, if the copy is made without authorization by continuously shooting a screened digital content in a theater or the like by intention using a camcorder or the like, the series of watermarks will be detected from the copy. However, if the copy is accidentally made in an unintentional and discontinuous manner in a birthday party or the like for example, using a camcorder or the like, the series of watermarks will not be detected from the copy. If the copy is judged as an unauthorized copy, it is possible to stop playback of the copy to exterminate unauthorized copies.

(2) The watermark embedding unit may divide audio data included in the digital content into blocks each having a second unit length, and sequentially embed the digital watermarks in the blocks in one-to-one correspondence.

With the stated structure, the series of watermarks that are different for every first unit length is embedded in the blocks of audio data included in the content each having a second unit length. Therefore, if the digital content is copied, it is possible to judge whether the copy is unauthorized based on whether the series of watermarks is detected from the copy.

(3) When embedding the series of watermarks into the blocks with sequentially associating therebetween, the watermark embedding unit may not embed a digital watermark in a corresponding block if the corresponding block includes a silent part, and embed a digital watermark in a corresponding block if the corresponding block does not include a silent part.

With the stated structure, the watermark embedding unit does not embed a watermark in a corresponding block that includes a silent part, and embeds a watermark in a corresponding block that does not include a silent part. Therefore, if the digital content is copied, it is possible to judge whether the copy is unauthorized based on whether the corresponding watermark is detected from each of the blocks not including the silent part. In other words, it is possible to judge whether the copy is authorized or not, even if the audio data included in the content includes silent part. Further, with the stated structure, even if shooting by the camcorder is stopped while the blocks including silent part is played back, and shooting by the camcorder is performed while the blocks not including silent part is played back, it is possible to judge whether the copy is made continuously without authorization or made discontinuously.

(4) The watermark embedding unit may sequentially embed, in one-to-one correspondence, the digital watermarks only in blocks that do not include silent parts.

With the stated structure, the watermarks are respectively embedded in the blocks of the audio part not including silent parts. Therefore, if the digital content is copied, it is possible to judge whether the copied content is unauthorized based on whether the series of watermarks are detected from the blocks of the audio part not including silent parts. In other words, it is possible to judge whether the copied content is unauthorized even in the case where the audio data included in the digital content includes silent parts.

(5) The first unit length may be N times longer than a second unit length, where N is a positive number, and the watermark embedding unit may divide audio data included in the digital content into blocks each having the second unit length, and embed the digital watermarks in the blocks such that a common watermark is embedded in every N blocks while sequentially associating the digital watermarks with each block group having the first unit length.

With the stated structure, a common watermark is embedded in N blocks included in the first unit length. Therefore, in the case where this content is copied, even if the watermark is not detected from a certain block for some reason, or detected wrongly, it is possible to detect the same watermark from the other blocks included in the first unit length. Therefore, it is possible to judge, for each unit for detection (having the first unit length), whether the series of watermarks are detected. Accordingly, it is possible to judge whether the copy is unauthorized.

(6) The watermark embedding unit may divide video data included in the digital content into blocks each having a second unit length, and sequentially embed the digital watermarks in the blocks in one-to-one correspondence.

With the stated structure, the series of watermarks is embedded in the blocks of video data included in the digital content, each having the second unit length. Therefore, if the digital content is copied, it is possible to judge whether the copy is unauthorized based on whether the series of watermarks is detected from the copy.

(7) The first unit length may be N times longer than a second unit length, where N is a positive number, and the watermark embedding unit may divide video data included in the digital content into blocks each having the second unit length, and sequentially embed the digital watermarks in the blocks such that a common watermark is embedded in every N blocks while sequentially associating the digital watermarks with each block group having the first unit length.

With the stated structure, a common watermark is embedded in N blocks included in the first unit length. Therefore, in the case where this content is copied, even if the watermark is not detected from a certain block for some reason, or detected wrongly, it is possible to detect the same watermark from the other blocks included in the first unit length. Therefore, it is possible to judge, for each unit for detection (having the first unit length), whether the series of watermarks are detected. Accordingly, it is possible to judge whether the copy is unauthorized.

(8) The watermark generating unit may generate the digital watermarks in accordance with a predetermined rule.

With the stated structure, the series of watermarks generated in accordance with the predetermined rule. Therefore, if the digital content is copied, it is possible to judge whether the copy is unauthorized by judging whether the series of watermarks generated in accordance with the predetermined rule is detected from the copy.

(9) The watermark generating unit may generate a sequence of monotonously increasing numbers as the series of the digital watermarks.

With the stated structure, if the digital content is copied, it is possible to judge whether the copy is unauthorized based on whether the sequence of monotonously increasing numbers as the series of watermarks are detected from the copy.

(10) The watermark generating unit may generate a sequence of cyclically changing numbers as the series of the digital watermarks.

With the stated structure, if the digital content is copied, it is possible to judge whether the copy is unauthorized based on whether the sequence of the cyclically changing numbers as the series of watermarks are detected from the copy. Moreover, it is possible to use counter (e.g. 4-bit counter capable of sequentially outputting 1 to 16) as the watermark generating unit. This means that it is possible to structure the watermark generating unit at a low cost.

(11) The digital watermark embedding apparatus may further comprise: a first encryption unit operable to encrypt, based on a content key, the digital content in which the digital watermarks have been embedded; a second encryption unit operable to encrypt the content key, based on a device key stored in a playback apparatus that plays back the digital content; and a recording unit operable to record the encrypted content and/or the encrypted content key on a recording medium.

With the stated structure, the digital content to be recorded on the recording medium and distributed is encrypted based on the content key, and the content key is encrypted based on the device key stored in a playback apparatus. As a result, it is possible to more highly protect the digital content against unauthorized copying.

(12) The digital watermark embedding apparatus may further comprise: a first encryption unit operable to encrypt, based on a content key, the digital content in which the digital watermarks have been embedded; a second encryption unit operable to encrypt the content key based on a device key stored in a playback apparatus that plays back the digital content; and an output unit operable to broadcast the encrypted content and/or the encrypted content key or output the encrypted content and/or the encrypted content key to a network.

With the stated structure, the digital content to be distributed via broadcasting or a network is encrypted based on the content key, and the content key is encrypted based on the device key stored in a playback apparatus. As a result, it is possible to more highly protect the digital content against unauthorized copying.

(13) Another aspect of the present invention is a digital watermark detection apparatus that detects watermarks from a digital content, the digital watermark detection apparatus comprising: a watermark detection unit operable to detect a series of digital watermarks that are different for every first unit length; and a control unit operable to control a manner how the digital content is handled, based on a result of the detection performed by the watermark detection unit.

With the stated structure, if the digital content is copied, it is possible to judge whether the copy is unauthorized based on whether the series of watermarks that are different for every first unit length is detected from the copy. The reason is the following. For example, if the copy is made without authorization by continuously shooting a screened digital content in a theater or the like by intention using a camcorder or the like, the series of watermarks will be detected from the copy. However, if the copy is accidentally made in an unintentional and discontinuous manner in a birthday party or the like for example using a camcorder or the like, the series of watermarks will not be detected from the copy. If the copy is judged as an unauthorized copy, it is possible to stop playback of the copy to exterminate unauthorized copies.

(14) The watermark detection unit may divide audio data included in the digital content into blocks each having a second unit length, and sequentially detect the digital watermarks from the blocks.

With the stated structure, the series of watermarks that are different for every first unit length is embedded in the blocks of audio data included in the content, each having the second unit length. Therefore, if the digital content is copied, it is possible to judge whether the copy is unauthorized based on whether the series of watermarks is detected from the copy.

(15) The digital watermark detection apparatus may further comprise: a comparison result storing unit operable to accumulate results of comparisons between each digital watermark detected by the watermark detection unit and an expected value of the digital watermark; and a judgment result output unit operable to judge whether the digital content is valid based on the accumulated results of the comparisons, and to output a judgment result.

With the stated structure, the results of the comparisons between the series of watermarks detected by the watermark detection unit and the expected value of the watermarks are stored, and whether the copied content is an unauthorized copy is judged based on the stored comparison results. For example, it is possible to judge based on the number of times the watermark detected by the watermark detection unit coincides with the expected value of the watermark, or based on the number of matches in a row, or based on a ratio of the matches to all the comparisons, or based on the number of mismatches.

(16) The digital watermark detection apparatus may further comprise: an expected value storing unit operable to store the expected value; and a comparing unit operable to compare each digital watermark detected by the watermark detection unit and the expected value stored in the expected value storing unit on a one-to-one basis, and to judge whether each result of the comparisons indicates a match, wherein the comparison result storing unit stores the number of matches indicated by the result of the comparisons.

With the stated structure, the comparison result storing unit stores the number of times the comparing unit judges that the watermark is the same as the expected value. Therefore, it is possible to judge whether the copied content is unauthorized based on the number.

(17) The judgment result output unit may output the judgment result to the control unit if the number stored in the comparison result storing unit reaches a predetermined number.

With the stated structure, it is possible to judge whether the copied content is unauthorized based on the number of times the comparing unit judges that the watermark is the same as the expected value, and the predetermined number.

(18) When the comparing unit judges negatively, the number of the matches stored in the comparison result storing unit and the expected value stored in the expected value storing unit may be reset.

With the stated structure, if the comparing unit judges that the watermark is not the same as the expected value, the comparison result storing unit resets the results of comparisons stored therein. Therefore, if the copy is accidentally made in an unintentional and discontinuous manner in a birthday party or the like for example, using a camcorder or the like, the watermark is judged to be not the same as the expected value, and the comparison result storing unit resets the comparison results. As a result, the accidentally created copy will not be judged as unauthorized, and the playback will not be stopped.

(19) If the number of times the comparing unit judges that the watermark mismatches with the expected value reaches a predetermined value, the number of the matches stored in the comparison result storing unit and the expected value stored in the expected value storing unit may be reset.

With the stated structure, if the number of times the comparing unit judges that the watermark is not the same as the expected value reaches the predetermined value, the comparison result storing unit resets the results of the comparisons stored therein. Therefore, if the copy is made without authorization by continuously shooting a screened digital content in a theater by intention using a camcorder or the like, even if the shooting is interrupted so that the number does not reach the predetermined number (e.g. The user intentionally moves the camera of the camcorder, or the shooting is interrupted for a moment by a person passing across in front of the camera), the comparison result storing unit does not reset the comparison results. As a result, the digital content will be judged as an unauthorized copy.

(20) If playback of the digital content is paused or stopped, the number of the matches stored in the comparison result storing unit and the expected value stored in the expected value storing unit may be reset.

With the stated structure, if playback of the digital content is paused or stopped, the comparison result storing unit resets the results of the comparison results. As a result, it is possible to prevent a digital content that is not an unauthorized copy from being judged as an unauthorized copy.

(21) The control unit may stop outputting audio data and/or video data included in the digital content, based on the judgment result output by the judgment result output unit.

With the stated structure, if a digital content is judged as an unauthorized copy, playback of the digital content will be stopped. Therefore, unauthorized copying can be expelled.

(22) The control unit may degrade quality of audio data and/or video data included in the digital content to be output, based on the judgment result output by the judgment result output unit.

With the stated structure, if the digital content is judged as an unauthorized copy, the control unit degrades the quality of the digital data. Therefore, unauthorized copying can be expelled.

(23) The control unit may mute or turn down a volume of the audio data included in the digital content, based on the judgment result output by the judgment result output unit.

With the stated structure, if the digital content is judged as an unauthorized copy, the control unit mutes or tones down the volume of the digital content. Therefore, unauthorized copying can be expelled.

(24) The watermark detection unit may detect the digital watermarks from blocks that do not include silent parts With the stated structure, if the digital content is copied, it is possible to judge whether the copied content is unauthorized copy based on whether the series of watermark is detected from the corresponding blocks of the audio part not including silent parts. In other words, it is possible to judge the content is unauthorized even if the audio part includes silent parts.

(25) Another aspect of the present invention is a recording medium having recorded thereon a digital content in which digital watermarks are embedded by a digital watermark embedding apparatus, wherein the digital watermark embedding apparatus comprises: a watermark generating unit operable to generate a series of digital watermarks that are different for every first unit length; and a watermark embedding unit operable to embed the digital watermarks in the digital content, wherein the recording medium records the digital content in which the digital watermarks that are different for every first unit length are embedded.

With the stated structure, the series of watermarks that are different for every first unit length is embedded in the digital content recorded on the recording medium. Therefore, if the digital content is copied, it is possible to judge whether the copy is unauthorized based on whether the series of watermarks that are different for every first unit length is detected from the copy. The reason is the following. For example, if the copy is made without authorization by continuously shooting a screened digital content in a theater or the like by intention using a camcorder or the like, the series of watermarks will be detected from the copy. However, if the copy is accidentally made in an unintentional and discontinuous manner in a birthday party or the like for example, using a camcorder or the like, the series of watermarks will not be detected from the copy. If the copy is judged as an unauthorized copy, it is possible to stop playback of the copy to exterminate unauthorized copies.

(26) Another aspect of the present invention is an information embedding apparatus that embeds a plurality of watermarks into a content along a playback time-line of the content, the content including a plurality of frames each including video data, the information embedding apparatus comprising: an acquisition unit operable to acquire the content; a positional information generating unit operable to generate pieces of positional information that show embedding target positions for target frames included in the plurality of frames on a one-to-one basis such that the embedding target positions varying according to a first rule, the first rule showing that the values should vary according to the sequential order on the playback time-line, and an embedding unit operable to embed any of the watermarks into corresponding frames, based on at least two of the pieces of positional information.

With the stated structure, the information embedding apparatus sequentially embeds the watermarks into the embedding target frames included in the content on the one-to-one basis, at the positions shown by the positional information generated by the positional information generating unit. As a result, if a content that includes two or more watermarks is recorded by a camcorder or the like while being played back, a playback apparatus that plays back the recorded content detects one or more watermarks, and can judge whether the content being played back is an unauthorized recording or not by checking whether the embedding positions of the one or more watermarks follow the first rule.

(27) Here, the information embedding apparatus may further comprise a strength information generating unit operable to generate pieces of strength information that show embedding strengths of the watermarks on a one-to-one basis and vary according to a second rule, the second rule showing that the embedding strengths should vary according to the sequential order on the playback time-line, wherein the embedding unit may embed the watermarks according to the embedding strengths shown by the strength information.

With the stated structure, the information embedding apparatus embeds each watermark based on the strength corresponding thereto. Accordingly, if a content that includes two or more watermarks is recorded by a camcorder or the like while being played back, a playback apparatus that plays back the recorded content can check whether the first rule relating to the embedding positions based on the positional information is followed and whether the second rule relating to the embedding strengths is followed while playing back the recorded content. This increases the protection against the unauthorized recording.

(28) Another aspect of the present invention is an information embedding apparatus that embeds a plurality of watermarks into a content along a playback time-line of the content, the information embedding apparatus comprising: an acquisition unit operable to acquire the content that is played back along the playback time-line; a strength information generating unit operable to generate pieces of strength information that show embedding strengths of the watermarks on a one-to-one basis and vary according to a rule, the rule showing that the embedding strengths should vary according to the sequential order on the playback time-line; and an embedding unit operable to arrange at least two of the pieces of strength information generated by the strength information generating unit along the playback time-line, and embed the watermarks into the content based on each of the arranged pieces of strength information.

With the stated structure, the information embedding apparatus sequentially embeds the watermarks into the embedding target frames included in the content on a one-to-one basis, according to the embedding strengths shown by the strength information generated by the strength information generating unit. As a result, if a content that includes two or more watermarks is recorded by a camcorder or the like while being played back, a playback apparatus that plays back the recorded content can judge whether the content being played back is an unauthorized recording or not by checking whether the embedding strengths of the watermarks follow the certain rule.

(29) Another aspect of the present invention is a detection apparatus that detects unauthorized use of a first content in a second content that includes at least a portion of the first content, the first content having been generated by the information embedding apparatus described in (26) above, the detection apparatus comprising: an information acquisition unit operable to detect from the second content one or more watermarks embedded in the first content, and acquire detection position information showing embedding positions of the detected watermarks; a first judging unit operable to judge whether embedding positions of the detected watermarks and one or more past watermarks detected in the past follow a first rule, the first rule showing that the values should vary according to a sequential order on a playback time-line; a second judging unit operable to judge whether a first total count is not less than a first threshold when the first judging unit has judged affirmatively, the first total count being a total count of the pieces of detection position information of the detected watermarks and the past watermarks; and a playback control unit operable to obstruct a normal playback of the second content when the second judging unit has judged affirmatively.

With the stated structure, the detection apparatus can judge whether the second content has been recorded without authorization, by checking whether pieces of detection position information corresponding to the detected two or more watermarks follow the first rule while the second content is being played back.

(30) Here, the plurality of watermarks may be embedded based on strengths that vary according to a second rule, the second rule showing that the strengths should vary according to the sequential order on the playback time-line, the first acquisition unit further acquires detection strength information that shows embedding strengths of the detected watermarks, the first judging unit judges further whether pieces of detection strength information of the detected watermarks and the past watermarks follow the second rule, the second judging unit further judges whether a second total count is not less than a second threshold when the first judging unit has judged affirmatively, the second total count being a total count of the pieces of embedding information of the detected watermarks and the past watermark, and the playback control unit obstructs a normal playback of the second content when only when the second judging unit has judged that the first total count is not less than the first threshold and the second total count is not less than the second threshold.

With the stated structure, the detection apparatus checks both the first rule of the embedding positions based on the detection position information and the second rule of the embedding strengths of the watermarks. This reinforces the judgment about whether the second content has been recorded without authorization.

(31) Another aspect of the present invention is a detection apparatus that detects unauthorized use of a first content in a second content that includes at least a portion of the first content, the first content having been generated by the information embedding apparatus described in (28) above, the detection apparatus comprising: an information acquisition unit operable to detect from the second content one or more watermarks embedded in the first content, and acquire embedding strength information showing embedding strengths of the detected watermarks; a first judging unit operable to judge whether embedding strengths of the detected watermarks and one or more past watermarks detected in the past follow a rule, the rule showing that the embedding strengths should vary according to a sequential order on a playback time-line; a second judging unit operable to judge whether a total count is not less than a threshold when the first judging unit has judged affirmatively, the first total count being a total count of the pieces of embedding strength information of the detected watermarks and the past watermarks; and a playback control unit operable to obstruct a normal playback of the second content when the second judging unit has judged affirmatively.

With the stated structure, the detection apparatus can judge whether the second content has been recorded without authorization, by checking whether pieces of embedding strength information corresponding to the detected two or more watermarks follow the rule for the first content, while the second content is being played back.

INDUSTRIAL APPLICABILITY

The digital watermark embedding apparatus and the digital watermark detection apparatus described above can be used for business purposes, in other words, can be used repeatedly and continuously, in the industry where digital contents are provided to users, in the manufacturing industry where apparatuses for playing back digital contents are manufactured, and in the selling industry where apparatuses for playing back digital contents are sold.

The invention claimed is:

1. A detection apparatus that detects unauthorized use of a first content in a second content that includes at least a portion of the first content, the detection apparatus comprising:
  a detection unit operable to detect from the second content one or more watermarks embedded in the first content;
  a first judging unit operable to judge whether values held by the detected watermarks and one or more past watermarks detected in the past follow a first rule, the first rule showing that the values should vary according to a sequential order on a playback time-line;
  a second judging unit operable to judge whether a first total count is not less than a first threshold when the first judging unit has judged affirmatively, the first total count being a total count of the detected watermarks and the past watermarks; and
  a playback control unit operable to obstruct a normal playback of the second content when the second judging unit has judged affirmatively,
  wherein the detection unit divides the second content into two or more playback blocks each having a prescribed length, and detects the watermarks from the playback blocks one by one,
  wherein the values held by the watermarks are counter values generated by a counter,
  wherein the detection unit detects the counter values from the playback blocks,
  wherein the first judging unit judges whether the counter values held by the detected watermarks and the past watermarks follow the first rule,
  wherein the second judging unit includes:
    a comparison value storage subunit operable to store a comparison value to be compared with the counter values;
    a update subunit operable to update the comparison value in prescribed cycles,
    a matching count storage subunit operable to store a count of times that the comparison value coincides with any of the counter values;
    a comparison subunit operable to compare the comparison value with the counter values, and update the matching count stored in the matching count storage subunit when judging that the comparison value coincides with any of the counter values;
    a consecutiveness judging subunit operable to judge whether the matching count as the first total count is not less than the first threshold; and
    a repetition control subunit operable to cause the comparison subunit and the consecutiveness judging subunit to repeat operations thereof until the detection unit finishes detecting the watermarks or the playback control unit starts obstructing the normal playback of the second content,
  wherein the playback control unit obstructs the normal playback of the second content when the consecutiveness judging subunit has judged affirmatively,
  wherein the second judging unit further includes:
    a non-matching count storage subunit operable to store a count of times that the comparison value does not coincide with any of the counter values;
    a non-matching count judging subunit operable to judge whether the non-matching count is greater than a prescribed threshold; and
    an initializing subunit operable to initialize the matching counter stored in the matching count storage subunit when the non-matching count judging subunit has judged affirmatively, and
  wherein the comparison subunit initializes the comparison value stored in the comparison value storage subunit when judging that the comparison value does not coincide with any of the counter values.

2. A detection apparatus that detects unauthorized use of a first content in a second content that includes at least a portion of the first content, the detection apparatus comprising:
  a detection unit operable to detect from the second content one or more watermarks embedded in the first content;
  a first judging unit operable to judge whether values held by the detected watermarks and one or more past watermarks detected in the past follow a first rule, the first rule showing that the values should vary according to a sequential order on a playback time-line;
  a second judging unit operable to judge whether a first total count is not less than a first threshold when the first judging unit has judged affirmatively, the first total count being a total count of the detected watermarks and the past watermarks; and
  a playback control unit operable to obstruct a normal playback of the second content when the second judging unit has judged affirmatively,
  wherein the first content includes a plurality of original frames,
  wherein the watermarks are embedded in embedding target frames included in the original frames on a one-to-one basis at positions that vary according to a second rule, the second rule showing that the positions where the watermarks are to be embedded should vary according to the sequential order on the playback time-line,
  wherein the second content includes a plurality of playback frames, at least one of which is any of the original frames,
  wherein when detecting the watermarks from detection target frames, the detection unit further acquires detection positions that show positions of the detected watermarks,
  wherein the first judging unit further judges whether or not the detection positions of the detected watermarks and one or more past detection positions corresponding to the past watermarks follow the second rule,
  wherein when the first judging unit has judged that the second rule is followed, the second judging unit further judges whether a second total count is not less than a second threshold, the second total count being a total count of the detection positions of the detected watermarks and the past detection positions corresponding to the past watermarks, and
  wherein the playback control unit obstructs the normal playback of the second content only when the second judging unit has judged that the first total count is not less than the first threshold and the second total count is not less than the second threshold.

3. The detection apparatus of claim 2,
  wherein the watermarks are embedded in the embedding target frames according to strengths of the watermarks, the strengths varying according to a third rule, the third rule showing that the strengths should vary according to the sequential order on the playback time-line,
  wherein when detecting the watermarks from the detection target frames, the detection unit further acquires detection strengths that show embedding strengths of the detected watermarks,
  wherein the first judging unit further judges whether or not the detection strengths of the detected watermarks and one or more past detection strengths corresponding to the past watermarks follow the third rule, wherein when the first judging unit has judged that the third rule is followed, the second judging unit further judges whether a third total count is not less than a third threshold, the third total count being a total count of the detection strengths of the detected watermarks and the past detection strengths corresponding to the past watermarks, and wherein the playback control unit obstructs the normal playback of the second content only when the second judging unit has judged that the first total count is not less than the first threshold and the second total count is not less than the second threshold and the third total count is not less than the third threshold.

4. A detection apparatus that detects unauthorized use of a first content in a second content that includes at least a portion of the first content, the detection apparatus comprising:

a detection unit operable to detect from the second content one or more watermarks embedded in the first content;

a first judging unit operable to judge whether values held by the detected watermarks and one or more past watermarks detected in the past follow a first rule, the first rule showing that the values should vary according to a sequential order on a playback time-line;

a second judging unit operable to judge whether a first total count is not less than a first threshold when the first judging unit has judged affirmatively, the first total count being a total count of the detected watermarks and the past watermarks; and a playback control unit operable to obstruct a normal playback of the second content when the second judging unit has judged affirmatively, wherein the watermarks are embedded in the embedding target frames according to strengths of the watermarks, the strengths varying according to a second rule, the second rule showing that the strengths should vary according to the sequential order on the playback time-line, wherein when detecting the watermarks from the detection target frames, the detection unit further acquires detection strengths that show embedding strengths of the detected watermarks, wherein the first judging unit further judges whether or not the detection strengths of the detected watermarks and one or more past detection strengths corresponding to the past watermarks follow the second rule, wherein when the first judging unit has judged that the second rule is followed, the second judging unit further judges whether a second total count is not less than a second threshold, the second total count being a total count of the detection strengths of the detected watermarks and the past detection strengths corresponding to the past watermarks, and wherein the playback control unit obstructs the normal playback of the second content only when the second judging unit has judged that the first total count is not less than the first threshold and the second total count is not less than the second threshold.

5. An information embedding/detection system comprising:

an information embedding apparatus that embeds a plurality of watermarks into a first content along a playback time-line of the first content; and a detection apparatus that detects unauthorized use of the first content in a second content that includes at least a portion of the first content, wherein the information embedding apparatus includes:
an acquisition unit operable to acquire the first content that is played back along the playback time-line;

a watermark generating unit operable to generate the watermarks such that values held by the watermarks vary according to a first rule, the first rule showing that the values should vary according to a sequential order on the playback time-line; and an embedding unit operable to embed two or more of the watermarks into the first content while keeping the sequential order, wherein the detection apparatus includes:

a detection unit operable to detect from the second content the watermarks embedded in the first content;

a first judging unit operable to judge whether values held by the detected watermarks and one or more past watermarks detected in the past follow the first rule;

a second judging unit operable to judge whether a first total count is not less than a threshold when the first judging unit has judged affirmatively, the first total count being a total count of the detected watermarks and the past watermarks; and a playback control unit operable to obstruct a normal playback of the second content when the second judging unit has judged affirmatively, wherein the detection unit divides the second content into two or more playback blocks each having a prescribed length, and detects the watermarks from the playback blocks one by one, wherein the values held by the watermarks are counter values generated by a counter, wherein the detection unit detects the counter values from the playback blocks, wherein the first judging unit judges whether the counter values held by the detected watermarks and the past watermarks follow the first rule, wherein the second judging unit includes:
a comparison value storage subunit operable to store a comparison value to be compared with the counter values;

a update subunit operable to update the comparison value in prescribed cycles, a matching count storage subunit operable to store a count of times that the comparison value coincides with any of the counter values;

a comparison subunit operable to compare the comparison value with the counter values, and update the matching count stored in the matching count storage subunit when judging that the comparison value coincides with any of the counter values;

a consecutiveness judging subunit operable to judge whether the matching count as the first total count is not less than the first threshold; and a repetition control subunit operable to cause the comparison subunit and the consecutiveness judging subunit to repeat operations thereof until the detection unit finishes detecting the watermarks or the playback control unit starts obstructing the normal playback of the second content, wherein the playback control unit obstructs the normal playback of the second content when the consecutiveness judging subunit has judged affirmatively, wherein the second judging unit further includes:
a non-matching count storage subunit operable to store a count of times that the comparison value does not coincide with any of the counter values;

a non-matching count judging subunit operable to judge whether the non-matching count is greater than a prescribed threshold; and an initializing subunit operable to initialize the matching counter stored in the matching count storage subunit when the non-matching count judging subunit has judged affirmatively, and wherein the comparison subunit initializes the comparison value stored in the comparison value storage subunit when judging that the comparison value does not coincide with any of the counter values.

6. A detection method used by a detection apparatus that detects unauthorized use of a first content in a second content that includes at least a portion of the first content, the detection method comprising:

a detection step of detecting from the second content one or more watermarks embedded in the first content;

a first judging step of judging whether values held by the detected watermarks and one or more past watermarks detected in the past follow a first rule, the first rule showing that the values should vary according to a sequential order on a playback time-line;

a second judging step of judging whether a first total count is not less than a first threshold when the first judging unit has judged affirmatively, the first total count being a total count of the detected watermarks and the past watermarks; and a playback control step of obstructing a normal playback of the second content when the second judging unit has judged affirmatively, wherein the detection step divides the second content into two or more playback blocks each having a prescribed length, and detects the watermarks from the playback blocks one by one, wherein the values held by the watermarks are counter values generated by a counter, wherein the detection step detects the counter values from the playback blocks, wherein the first judging step judges whether the counter values held by the detected watermarks and the past watermarks follow the first rule, wherein the second judging step includes:
- a comparison value storage step of storing a comparison value to be compared with the counter values;
- a update step of updating the comparison value in prescribed cycles,
- a matching count storage step of storing a count of times that the comparison value coincides with any of the counter values;
- a comparison step of comparing the comparison value with the counter values, and updating the matching count stored by the matching count storage step when judging that the comparison value coincides with any of the counter values;
- a consecutiveness judging step of judging whether the matching count as the first total count is not less than the first threshold; and
- a repetition control step of causing the comparison step and the consecutiveness judging step to repeat operations thereof until the detection step finishes detecting the watermarks or the playback control step starts obstructing the normal playback of the second content, wherein the playback control step obstructs the normal playback of the second content when the consecutiveness judging step has judged affirmatively, wherein the second judging step further includes:
- a non-matching count storage step of storing a count of times that the comparison value does not coincide with any of the counter values;
- a non-matching count judging step of judging whether the non-matching count is greater than a prescribed threshold; and
- an initializing step of initializing the matching counter stored by the matching count storage step when the non-matching count judging step has judged affirmatively, and wherein the comparison step initializes the comparison value stored by the comparison value storage step when judging that the comparison value does not coincide with any of the counter values.

7. A non-transitory computer readable recording medium having stored thereon a detection program used by a detection apparatus that detects unauthorized use of a first content in a second content that includes at least a portion of the first content, wherein, when executed, the detection program causes the detection apparatus to perform a method comprising:

a detection step of detecting from the second content one or more watermarks embedded in the first content;

a first judging step of judging whether values held by the detected watermarks and one or more past watermarks detected in the past follow a first rule, the first rule showing that the values should vary according to a sequential order on a playback time-line;

a second judging step of judging whether a first total count is not less than a first threshold when the first judging unit has judged affirmatively, the first total count being a total count of the detected watermarks and the past watermarks; and a playback control step of obstructing a normal playback of the second content when the second judging unit has judged affirmatively, wherein the detection step divides the second content into two or more playback blocks each having a prescribed length, and detects the watermarks from the playback blocks one by one, wherein the values held by the watermarks are counter values generated by a counter, wherein the detection step detects the counter values from the playback blocks, wherein the first judging step judges whether the counter values held by the detected watermarks and the past watermarks follow the first rule, wherein the second judging step includes:
- a comparison value storage step of storing a comparison value to be compared with the counter values;
- a update step of updating the comparison value in prescribed cycles,
- a matching count storage step of storing a count of times that the comparison value coincides with any of the counter values;
- a comparison step of comparing the comparison value with the counter values, and updating the matching count stored by the matching count storage step when judging that the comparison value coincides with any of the counter values;
- a consecutiveness judging step of judging whether the matching count as the first total count is not less than the first threshold; and
- a repetition control step of causing the comparison step and the consecutiveness judging step to repeat operations thereof until the detection step finishes detecting the watermarks or the playback control step starts obstructing the normal playback of the second content, wherein the playback control step obstructs the normal playback of the second content when the consecutiveness judging step has judged affirmatively, wherein the second judging step further includes:
- a non-matching count storage step of storing a count of times that the comparison value does not coincide with any of the counter values;
- a non-matching count judging step of judging whether the non-matching count is greater than a prescribed threshold; and
- an initializing step of initializing the matching counter stored by the matching count storage step when the non-matching count judging step has judged affirmatively, and wherein the comparison step initializes the comparison value stored by the comparison value storage step when judging that the comparison value does not coincide with any of the counter values.

8. An integrated circuit for a detection apparatus that detects unauthorized use of a first content in a second content that includes at least a portion of the first content, the integrated circuit comprising:
- a detection unit operable to detect from the second content one or more watermarks embedded in the first content;
- a first judging unit operable to judge whether values held by the detected watermarks and one or more past watermarks detected in the past follow a first rule, the first rule showing that the values should vary according to a sequential order on a playback time-line;
- a second judging unit operable to judge whether a first total count is not less than a first threshold when the first judging unit has judged affirmatively, the first total count being a total count of the detected watermarks and the past watermarks; and
- a playback control unit operable to obstruct a normal playback of the second content when the second judging unit has judged affirmatively, wherein the detection unit divides the second content into two or more playback blocks each having a prescribed length, and detects the watermarks from the playback blocks one by one, wherein the values held by the watermarks are counter values generated by a counter, wherein the detection unit detects the counter values from the playback blocks, wherein the first judging unit judges whether the counter values held by the detected watermarks and the past watermarks follow the first rule, wherein the second judging unit includes:
- a comparison value storage subunit operable to store a comparison value to be compared with the counter values;
- a update subunit operable to update the comparison value in prescribed cycles,
- a matching count storage subunit operable to store a count of times that the comparison value coincides with any of the counter values;
- a comparison subunit operable to compare the comparison value with the counter values, and update the matching count stored in the matching count storage subunit when judging that the comparison value coincides with any of the counter values;
- a consecutiveness judging subunit operable to judge whether the matching count as the first total count is not less than the first threshold; and
- a repetition control subunit operable to cause the comparison subunit and the consecutiveness judging subunit to repeat operations thereof until the detection unit finishes detecting the watermarks or the playback control unit starts obstructing the normal playback of the second content, wherein the playback control unit obstructs the normal playback of the second content when the consecutiveness judging subunit has judged affirmatively, wherein the second judging unit further includes:
- a non-matching count storage subunit operable to store a count of times that the comparison value does not coincide with any of the counter values;
- a non-matching count judging subunit operable to judge whether the non-matching count is greater than a prescribed threshold; and
- an initializing subunit operable to initialize the matching counter stored in the matching count storage subunit when the non-matching count judging subunit has judged affirmatively, and wherein the comparison subunit initializes the comparison value stored in the comparison value storage subunit when judging that the comparison value does not coincide with any of the counter values.

* * * * *